United States Patent
Murayama et al.

(10) Patent No.: US 10,587,786 B2
(45) Date of Patent: Mar. 10, 2020

(54) IMAGING DEVICE, IMAGING OPTICAL SYSTEM, METHOD FOR MANUFACTURING IMAGING DEVICE, AND IMAGING METHOD

(71) Applicant: NIKON CORPORATION, Minato-ku, Tokyo (JP)

(72) Inventors: Norio Murayama, Musashino (JP); Susumu Sato, Yotsukaido (JP); Daisaku Arai, Kawasaki (JP); Misa Kawamura, Ebina (JP); Marie Shimoyama, Tokyo (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 15/741,800

(22) PCT Filed: Jul. 11, 2016

(86) PCT No.: PCT/JP2016/070368
§ 371 (c)(1),
(2) Date: Jan. 4, 2018

(87) PCT Pub. No.: WO2017/010440
PCT Pub. Date: Jan. 19, 2017

(65) Prior Publication Data
US 2018/0213130 A1   Jul. 26, 2018

(30) Foreign Application Priority Data

Jul. 10, 2015  (JP) .................... 2015-138677
Jul. 6, 2016   (JP) .................... 2016-134308

(51) Int. Cl.
*H04N 5/225*  (2006.01)
*G02B 13/00*  (2006.01)
*H04N 5/232*  (2006.01)

(52) U.S. Cl.
CPC ......... *H04N 5/2254* (2013.01); *G02B 13/004* (2013.01); *G02B 13/006* (2013.01); *G02B 13/0035* (2013.01); *H04N 5/23293* (2013.01)

(58) Field of Classification Search
CPC .. H04N 5/2254; H04N 5/2253; H04N 5/2259; H04N 5/23293; H04N 5/349;
(Continued)

(56) References Cited

U.S. PATENT DOCUMENTS

| 4,467,361 A | 8/1984 | Ohno et al. |
| 5,428,392 A | 6/1995 | Castro et al. |

(Continued)

FOREIGN PATENT DOCUMENTS

| JP | S58-029274 A | 2/1983 |
| JP | H02-140076 A | 5/1990 |

(Continued)

OTHER PUBLICATIONS

English translation of International Preliminary Report on Patentability from International Patent Application No. PCT/JP2016/070368, dated Jan. 25, 2018.
(Continued)

*Primary Examiner* — Twyler L Haskins
*Assistant Examiner* — Fayez Bhuiyan
(74) *Attorney, Agent, or Firm* — Shapiro, Gabor and Rosenberger, PLLC

(57) ABSTRACT

An imaging device (10) is configured by being provided with an image pickup element (40) where an imaging surface (41) having a concave surface facing an object side is formed, an imaging optical system (20) which forms an image on the imaging surface (41) in a range smaller than the imaging surface (41), and an oscillating drive section (30) which oscillating-drives the imaging optical system (20) so that a direction of an optical axis Z of the imaging
(Continued)

optical system changes. The imaging element (40) captures a first formed by the imaging optical system (20) with a direction of the optical axis Z set to a first direction and a 2nd formed by the imaging optical system (20) with a direction of the optical axis Z set to a 2nd direction, in different regions in the imaging surfaces (41).

23 Claims, 17 Drawing Sheets

(58) Field of Classification Search
CPC .. H04N 5/3696; G02B 7/023; G02B 13/0035; G02B 13/004; G02B 13/006; G02B 26/101; G03B 5/06; G03B 15/00; G03B 37/00; G03B 37/02
See application file for complete search history.

(56) References Cited

U.S. PATENT DOCUMENTS

| | | |
|---|---|---|
| 5,650,813 A | 7/1997 | Gilblom et al. |
| 2012/0033960 A1 | 2/2012 | Hashimoto |
| 2013/0063634 A1* | 3/2013 | Yamano ............. G02B 13/0035 |
| | | 348/294 |
| 2015/0077619 A1 | 3/2015 | Yamano |
| 2016/0227085 A1* | 8/2016 | Xu ......................... H04N 5/225 |

FOREIGN PATENT DOCUMENTS

| | | |
|---|---|---|
| JP | H06-222481 A | 8/1994 |
| JP | H09-018750 A | 1/1997 |
| JP | 2002-158912 A | 5/2002 |
| JP | 2006-129391 A | 5/2006 |
| JP | 2007-101662 A | 4/2007 |
| JP | 2013-061476 A | 4/2013 |
| JP | 2014-202760 A | 10/2014 |
| WO | WO 2010/125994 A1 | 4/2010 |

OTHER PUBLICATIONS

International Search Report from International Patent Application No. PCT/JP2016/070368, dated Oct. 11, 2016.
Office Action dated May 28, 2019, in Japanese Patent Application No. 2015-138677.
Office Action dated Jan. 6, 2020, in Chinese Patent Application No. 201680040876.6.

* cited by examiner

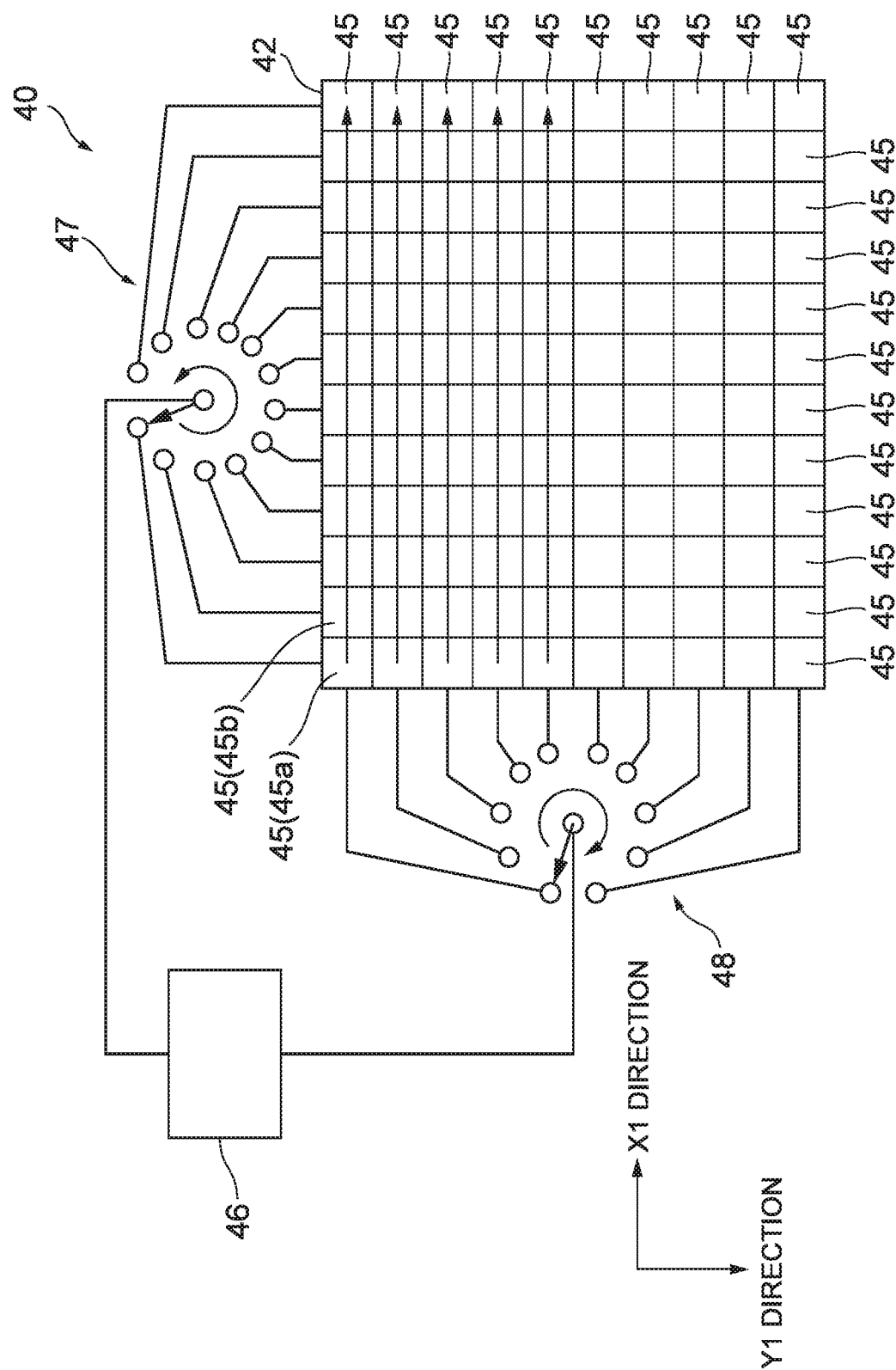

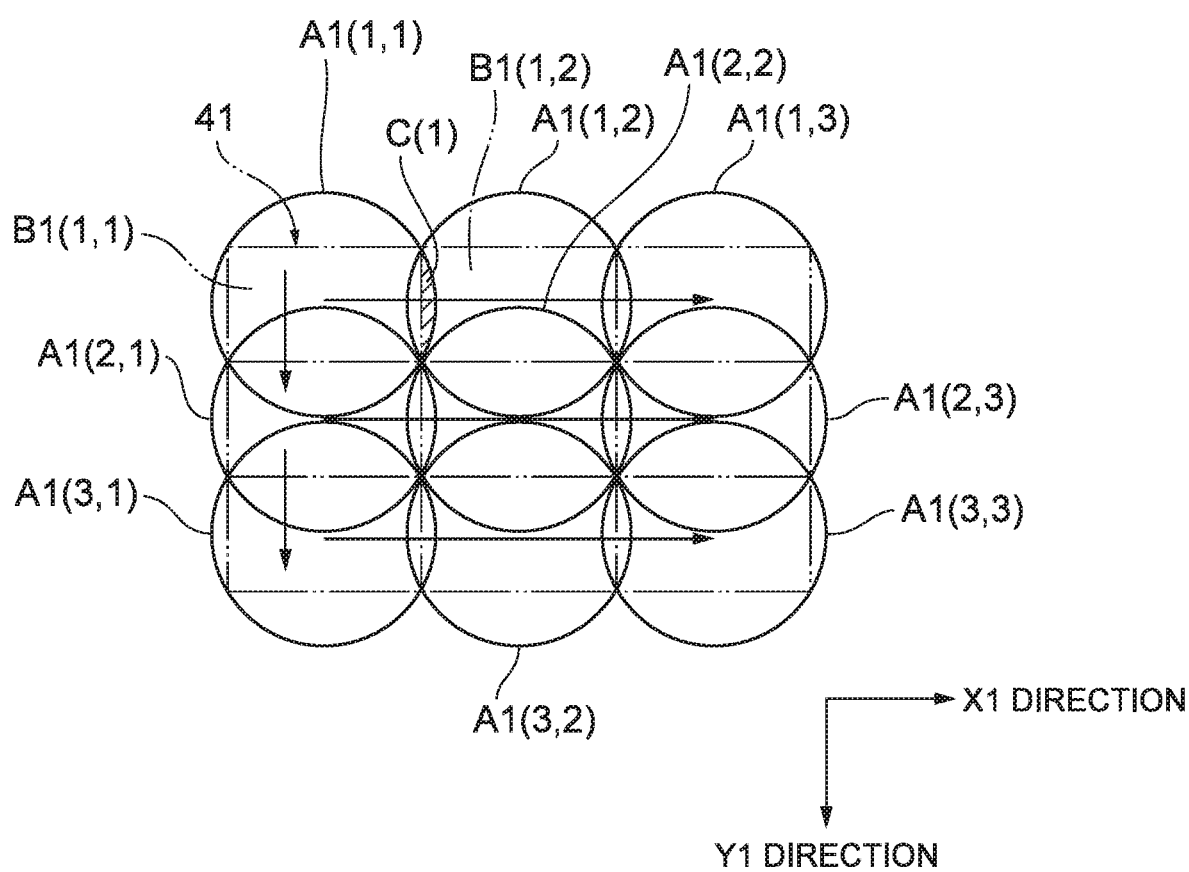

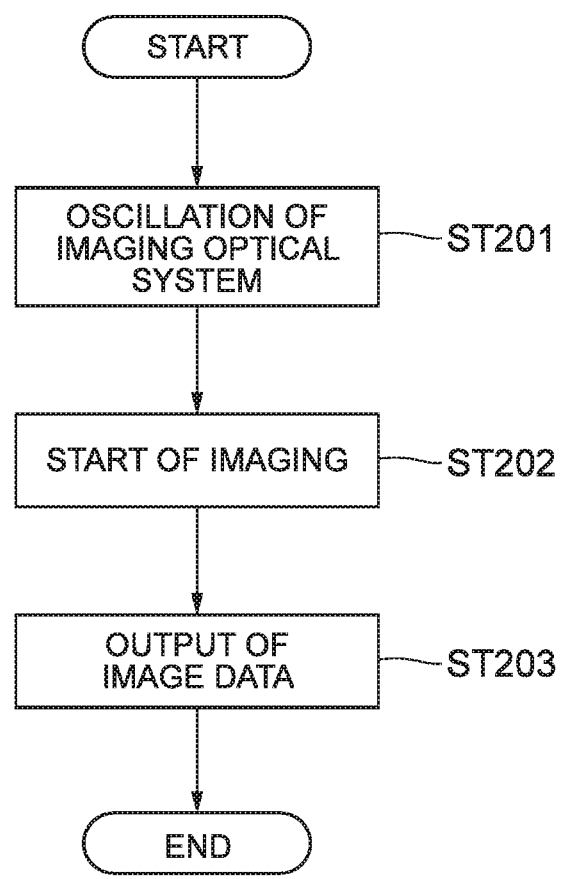

X2 DIRECTION
Y2 DIRECTION

IMAGING DEVICE, IMAGING OPTICAL SYSTEM, METHOD FOR MANUFACTURING IMAGING DEVICE, AND IMAGING METHOD

TECHNICAL FIELD

The present invention relates to an imaging device, an imaging optical system, a manufacturing method of the imaging device and an imaging method.

TECHNICAL BACKGROUND

In recent years, an imaging device is incorporated also in a portable terminal and a personal computer, etc. For an imaging optical system used for an imaging device such as a portable terminal (refer to Patent document 1, for example), a high image formation performance is required in association with fining of a pixel of an image pickup element. In addition, for such an imaging optical system, it is also required to achieve a smaller size in association with making a portable terminal, etc. thin. For this reason, a method for enhancing an image formation performance by making an imaging optical system smaller has been requested conventionally.

PRIOR ARTS LIST

Patent Document

Patent document 1: Japanese Laid-Open Patent Publication No. 2013-61476(A)

SUMMARY OF THE INVENTION

An imaging device according to the present invention includes: an image pickup element provided with an imaging surface; an optical system which forms an image on the imaging surface in a range smaller than imaging surface; and a drive section which drives the optical system so that a direction of an optical axis of the optical system may change, wherein the image pickup element captures a first image formed by the optical system with a direction of the optical axis set to a first direction and a second image formed by the optical system with a direction of the optical axis set to a second direction in different regions in the imaging surface.

An imaging optical system according to the present invention is an imaging optical system which forms an image on a imaging surface curved so as to have a concave surface facing an object side including a moving section provided with at least one lens, wherein the moving section is movable relatively to the imaging surface so that an image forming position in accordance with an object point of the same range may move along the concave surface.

Another imaging device according to the present invention includes the imaging optical system and an image pickup element which captures a subject image formed by the imaging optical system, wherein the image pickup element has an effective acceptance surface which forms at least a part of the imaging surface, and a visual field range of the imaging optical system is smaller than a range of the effective acceptance surface.

A manufacturing method of an imaging device according to the present invention is an manufacturing method of an imaging device including the imaging optical system and an image pickup element which captures a subject image formed by the imaging optical system, wherein the image pickup element has an effective acceptance surface which forms at least a part of the imaging surface, and a visual field range of the imaging optical system is configured so as to be smaller than a range of the effective acceptance surface, and the image pickup element is made to be moved using an image imaging-acquired by the image pickup element in a state with the moving section moved to a prescribed reference position with respect to the imaging surface, and adjusting is carried out so that a prescribed part of the image pickup element may be located on an optical axis of the imaging optical system.

An imaging method according to the present invention is an imaging method using the imaging optical system and an image pickup element which captures a subject image formed by the imaging optical system, wherein the image pickup element, while an effective acceptance surface which forms at least a part of the imaging surface is formed, has an effective light acceptance section capable of receiving a light from the imaging optical system, and the effective light acceptance section has at least a 1st pixel and a 2nd pixel, and a visual field range of the imaging optical system is configured so as to be smaller than a range of the effective acceptance surface, and an optical axis of the imaging optical system is made to be located at least in one region of the 1st pixel and the 2nd pixel by movement of the moving section with respect to the imaging surface, and the image pickup element is made to output image data as single image data synthesizing image data at the time of an optical axis of the imaging optical system being located in a region of the 1st pixel and image data at the time of an optical axis of the imaging optical system being located in a region of the 2nd pixel.

BRIEF DESCRIPTION OF THE DRAWINGS

FIG. 3 illustrates a schematic diagram of an image pickup element;

FIG. 5 illustrates an expanded schematic diagram indicating the 1st method of scanning a subject in the first embodiment;

FIG. 9 illustrates a flow chart indicating an imaging method using the imaging device according to the first embodiment;

DESCRIPTION OF EMBODIMENTS

Figure 1:
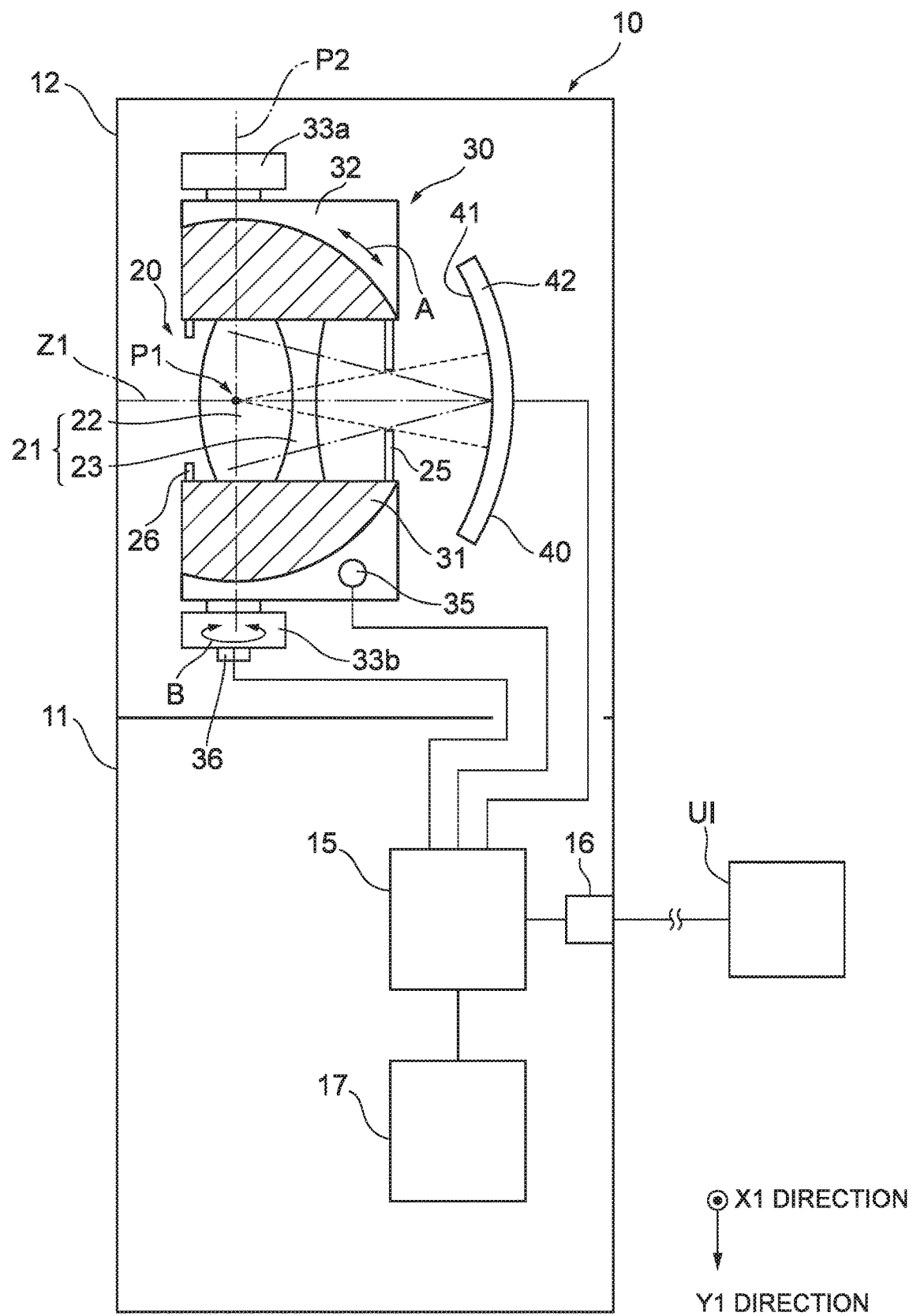
FIG. 1 illustrates a sectional view of an imaging device according to a first embodiment.

Hereinafter, preferred embodiments of the present application will be described with reference to drawings. First, an imaging device 10 provided with an imaging optical system 20 according to a first embodiment will be described with reference to FIG. 1. FIG. 1 illustrates a sectional view of a fixed type imaging device 10 which is usable as a monitoring camera and an endoscope, etc. The imaging device 10 is configured with a lens barrel section 12 and a control section 15, etc. housed in a device body 11. The lens barrel section 12 is configured by being provided with the imaging optical system 20, an oscillating drive section 30 which makes the imaging optical system 20 oscillate within the lens barrel section 12, and an image pickup element 40 disposed fixedly on the lens barrel section 12, opposing to the imaging optical system 20.

The imaging optical system 20 makes an image of a subject (physical object) formed on an imaging surface 41 of the image pickup element 40. The image pickup element 40 is provided with a function to generate an imaging signal while photo-electrically converting an image light of a subject formed on the imaging surface 41 by the imaging optical system 20, and outputs the imaging signal to the control section 15. The imaging surface 41 has a shape curved spherically so as to have a concave surface facing an object side, and the imaging optical system 20 is configured so as to make a subject image formed on the imaging surface 41 which is curved as described above. Namely, the imaging optical system 20 is configured so as to form a spherical image located in the same surface shape as the spherically curved imaging surface 41. Incidentally, the imaging surface 41 may be curved to the extent of a semi-sphere. A visual field range of the imaging optical system 20 is set to a range smaller than a range of the imaging surface 41 of the image pickup element 40. Namely, the imaging device 10 is small and the imaging optical system 20 is also small, and the visual field range of the imaging optical system 20 is small, and a magnitude of a subject image (visual field image) formed by the imaging optical system 20 is made to be smaller than the imaging surface 41. The oscillating drive section 30 makes the imaging optical system 20 oscillate relatively to the image pickup element 40, and makes an optical axis Z1 of the imaging optical system 20 move within the imaging surface 41 of the image pickup element 40. Namely, the oscillating drive section 30 drives the imaging optical system 20 so that a direction of the optical axis Z1 of the imaging optical system 20 may change.

The control section 15 receives an imaging signal from the image pickup element 40. Thereby, the control section 15 performs various image processing to generate image data of a subject, while receiving an imaging signal from the image pickup element 40. Although the control section 15 outputs a drive signal to the oscillating drive section 30 to drive-control the oscillating drive section 30, furthermore, descriptions thereof will be described later. Furthermore, the control section 15 is electrically connected with an input output section 16 provided in the device body 11 and with a storage unit 17 housed in the device body 11. Incidentally, the storage unit 17 may be built-in in the imaging device 10, and may be electrically connected with the imaging device 10 by being inserted into the imaging device 10 from the outside. The input output section 16 is electrically connected with a user interface UI provided in the outside of the imaging device 10. The input output section 16 receives an operation signal from the user interface UI according to a user's operation (imaging manipulation, etc.), and transmits the operation signal to the control section 15. The control section 15 outputs the subject's image data made in the control section 15 while being imaging-acquired by the image pickup element 40 to the user interface UI. Thereby, in a display section of the user interface UI, it is possible to carry out displaying of an image of a subject captured by the imaging device 10. The storage unit 17 stores data necessary for operation of the image pickup element 40 and the oscillating drive section 30, etc., and the subject's image data made in the control section 15 while being imaging-acquired by the image pickup element 40. Incidentally, the storage unit 17 may be provided in an external device such as a server. In this case, the imaging device 10 transmits/receives data to/from the storage unit 17 in the external device while using a wireless communication etc.

The imaging optical system 20 is configured by being provided with a moving lens 21, a field diaphragm 25, and an aperture stop 26. The moving lens 21 is configured by one cemented lens with a positive lens 22 and a negative lens 23 cemented in order from an object side. In the present embodiment, as for lenses in the imaging optical system 20, only the moving lens 21 is included. Incidentally, in FIG. 1 and FIG. 2, the moving lens 21 is illustrated while being simplified. The field diaphragm 25 is disposed in an image side rather than the moving lens 21 side, and configures a visual field range of the imaging optical system 20. The aperture stop 26 to determine brightness (f number) of the imaging optical system 20 is disposed in the neighborhood of the object side of the moving lens 21.

The image pickup element 40 is configured by an image sensor such as a CCD and a CMOS, for example. Although the image pickup element 40 is fixedly held by an image pickup element holding section (not illustrated) provided in the lens barrel section 12, the fixedly holding position of the image pickup element 40 is able to be adjusted by the image pickup element holding section. The positioning adjustment will be described later. The image pickup element 40 is configured by having pixels (photoelectric conversion element) constituting a CCD and a CMOS image sensor disposed spherically and curvedly along the imaging surface 41 so as to have a concave surface facing an object side.

Configuration principle as an example of the image pickup element 40 is illustrated in FIG. 3. The image pickup element 40 according to the example is provided with two or more of photoelectric conversion elements 45, 45, . . . disposed in a matrix shape two-dimensionally along the imaging surface 41, and each constitutes a pixel. As for the photoelectric conversion elements 45, 45, . . . which constitute pixels respectively, within a plane orthogonal to the optical axis Z1 of the imaging optical system 20 (where, "plane" is the imaging surface 41, and "within a plane" is "within a spherically curved plane"), for example, m elements (m is a natural number of 2 or more) along a direction (this is referred to as an X1 direction) orthogonal to a paper surface of FIG. 1 and n elements (n is a natural number of 2 or more) along a direction (this is referred to as Y1 direction) orthogonal to the X1 direction are disposed in order in a matrix shape.

As illustrated in FIG. 3, the image pickup element 40 is provided with an output section 47 which outputs an imaging signal based on an electrical signal from a line of photoelectric conversion elements 45 disposed in the Y1 direction and an output section 48 which outputs an imaging signal based on an electrical signal from a line of photoelectric conversion elements disposed in the X1 direction, and takes out the electrical signal from each photoelectric conversion element 45 into an output section 46 in order. The signal taken out into the output section 46 is sent to the control section 15 where image processing is performed. Incidentally, FIG. 3 illustrates an example of a configuration principle, and detailed descriptions will be omitted since a configuration and an operation of a CCD image sensor and a CMOS image sensor are well known conventionally.

Figure 2:
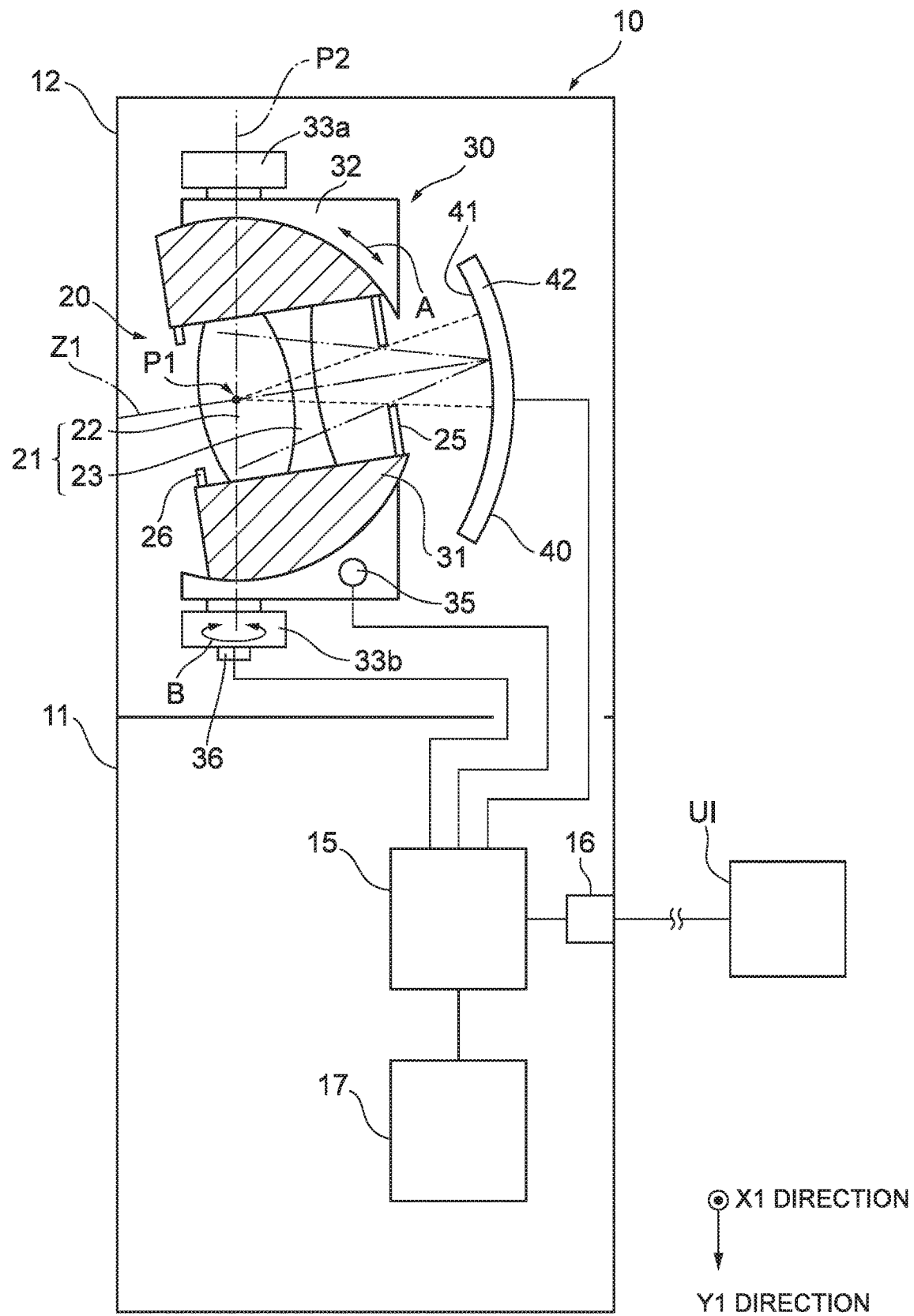
FIG. 2 illustrates a sectional view indicating a state where an imaging optical system is made to be oscillated in the imaging device according to the first embodiment.

The oscillating drive section 30 is one for oscillating-driving the imaging optical system 20, and is configured by being provided with a lens holding section 31, a 1st support section 32, a 2nd support sections 33a and 33b, a 1st drive section 35, and a 2nd drive section 36, as illustrated in FIG. 1 and FIG. 2. The lens holding section 31 is provided with a cylindrical space, and here disposes and holds the aperture stop 26, the moving lens 21 and the field diaphragm 25, which constitute the imaging optical system 20, along an optical axis in order from the object side as illustrated. The lens holding section 31 has an outer circumference surface formed in a cylindrical shape extended in a direction (X1 direction) perpendicular to the paper surface, and the outer circumference surface is supported by the 1st support section having a cylindrical inner surface extended in the X1 direction so as to oscillate freely as illustrated by an arrow A. Furthermore, the 1st support section 32 is supported rotatably by the 2nd support sections 33a and 33b with respect to a device body 21 as illustrated by an arrow B. The oscillating support of the lens holding section 31 by the 1st support section 32 is configured so as to oscillate freely around an oscillating central axis extended in the X1 direction through a point P1 on the optical axis Z1 of the imaging optical system 20. The support of the 1st support section 32 by the 2nd support sections 33a and 33b is configured so as to be rotatable around a rotating central axis P2 extended in the Y1 direction (vertical direction) through the above-mentioned point P. As is clear from the above descriptions, a gimbal mechanism is configured based on the oscillating support structure of the lens holding section 31 by the 1st support section 32 and the rotating support structure of the 1st support section 32 by the 2nd support sections 33a and 33b.

Incidentally, a position of the point P1 described above may be configured at a position of an exit pupil of the imaging optical system 20 or in the neighborhood thereof. In other words, the position of the point P1 may be configured at a position of the curvature center or in the neighborhood thereof of the imaging surface 41 having a concave surface facing an object side.

As illustrated in FIG. 1 and FIG. 2, based on the gimbal mechanism like this, the whole imaging optical system 20 (namely, the moving lens 21 being integrated with the field diaphragm and the aperture stop 26) is oscillatable around the oscillation axis extended in the X1 direction through the oscillating central point P1 as illustrated by the arrow A, and is rotatable around the rotating central axis P2 extended in the Y1 direction as illustrated by the arrow B. For example, in FIG. 2, illustrated is a state where the imaging optical system 20 oscillates in the direction of the arrow A. For the purpose of the oscillation like this being made to be performed, the 1st drive section 35 which oscillating-drives the lens holding section 31 in the direction of the arrow A with respect to the 1st support section 32, and the 2nd drive section 36 which rotating-drives the 1st support section 32 in the direction of the arrow B with respect to the 2nd support sections 33a and 33b are provided. The 1st drive section 35 and the 2nd drive section 36 are made up of a servo motor, for example, and are drive-controlled while receiving a drive signal from the control section 15.

By operating the gimbal mechanism while the 1st drive section 32 and the 2nd drive section 33 being combined in this way, it is possible to 2-axis-oscillate the imaging optical system 20 around the oscillating central point P1. By oscillating the moving lens 21 integrally with the field diaphragm 25 and the aperture stop 26 in this way, the optical axis Z1 of the imaging optical system 20 moves within the imaging surface 41 of the image pickup element 40, and an image forming position by the imaging optical system 20 moves along the imaging surface 41 having a concave shape. Thereby, it is possible to move a subject image formed by the imaging optical system 20 along the imaging surface 41 having a concave shape, and it is possible to scan and capture a subject over a range wider than the visual field range of the imaging optical system 20. Therefore, even in a case of using an imaging device having a narrow visual field range while making the imaging optical system 20 miniaturized, it is possible to capture a large subject image. In this case, an image formed by the imaging optical system 20, the image being an image of a subject located at an object point of the same range will move along the imaging surface 41 having a concave shape, and it is possible to acquire an image with less blur. In addition, it may be possible to make uniaxial oscillation achieved using either the 1st drive section 32 or the 2nd drive section 33.

Figure 4A:
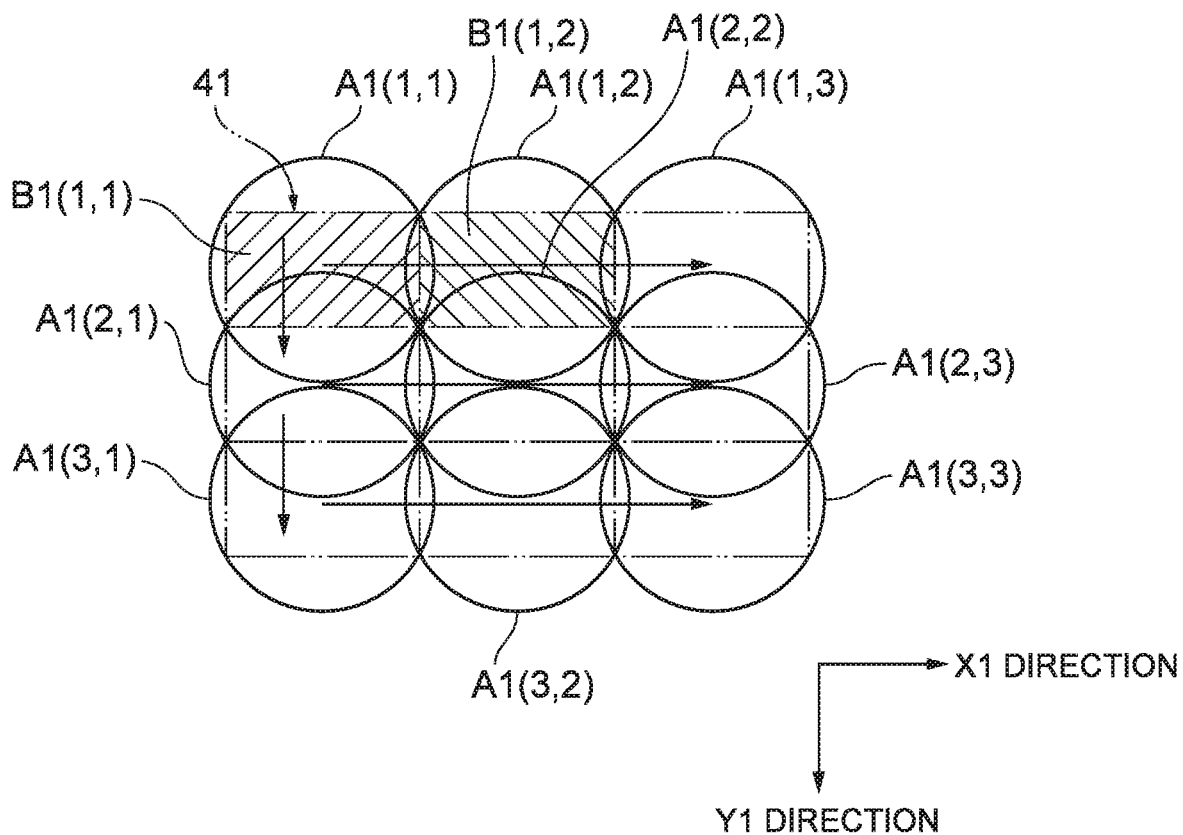
FIG. 4A illustrates a schematic diagram indicating a 1st method of scanning a subject in the first embodiment.

Meanwhile, the imaging device 10 according to the present embodiment is a device having reduction in size and weight realized, and the imaging optical system 20 is also miniaturized, and the visual field range is narrow. For this reason, as illustrated in FIG. 4A, for example, a subject image corresponding to a visual field range formed on the imaging surface 41 by the imaging optical system 20 has a small circular shape illustrated by a reference sign A1. As is clear from FIG. 4A, a magnitude of the subject image A1 (hereinafter, referred to as visual field image A1) corresponding to the visual field range is smaller than the imaging surface 41, and with the situation as it is, image data of a narrow visual field range formed in a part of the imaging surface 41 is only acquired. For this reason, the imaging device 10 is configured so as to oscillate the imaging optical system 20 vertically and horizontally (longitudinally and laterally) with respect to a subject by the oscillating drive section 30, and displace the visual field range of the imaging optical system 20, and then, carry out imaging while scanning a subject longitudinally and laterally.

For example, as illustrated in FIG. 4A first, the imaging optical system 20 is moved by the oscillating drive section 30 so that a visual field image A1 (1, 1) is formed at the upper left end of the imaging surface 41 of the imaging optical system 20 and the imaging optical system 20 captures (or obtains) the image. Next, the imaging optical system 20 is moved in the X1 direction so as to form a visual field image A1 (1, 2) located in the right side, and captures the image. Further, the imaging optical system 20 is moved so as to form a visual field image A1 (1, 3) in the right side, and captures the image. Then, the imaging optical system 20 is moved to the left end and downward (Y direction) so as to form a visual field image A1 (2, 1), and captures the image. Hereinafter, in the same way, the imaging optical system 20 captures one by one down to a visual field image A1 (2, 3) of the right end. Further, the imaging optical system 20 is moved to the left end and downward (Y direction) so as to form a visual field image A1 (3, 1), and captures the image. When the imaging device 10 moves the position of the visual field image one by one down to the lower right end and to capture the image, it is possible to capture subject images over the whole surface of the imaging surface 41 as shown in FIG. 4A. Thereby, it is possible to capture a subject image in a large visual field range corresponding to the whole surface of the imaging surface 41 by using a small imaging optical system 20 which only forms a small visual field image A1. In this case, a reference position at the time of displacing a visual field range of the imaging optical system 20 is definite, and it is possible to scan and capture a subject having a range wider than the visual field range of the imaging optical system 20 accurately.

Figure 4B:
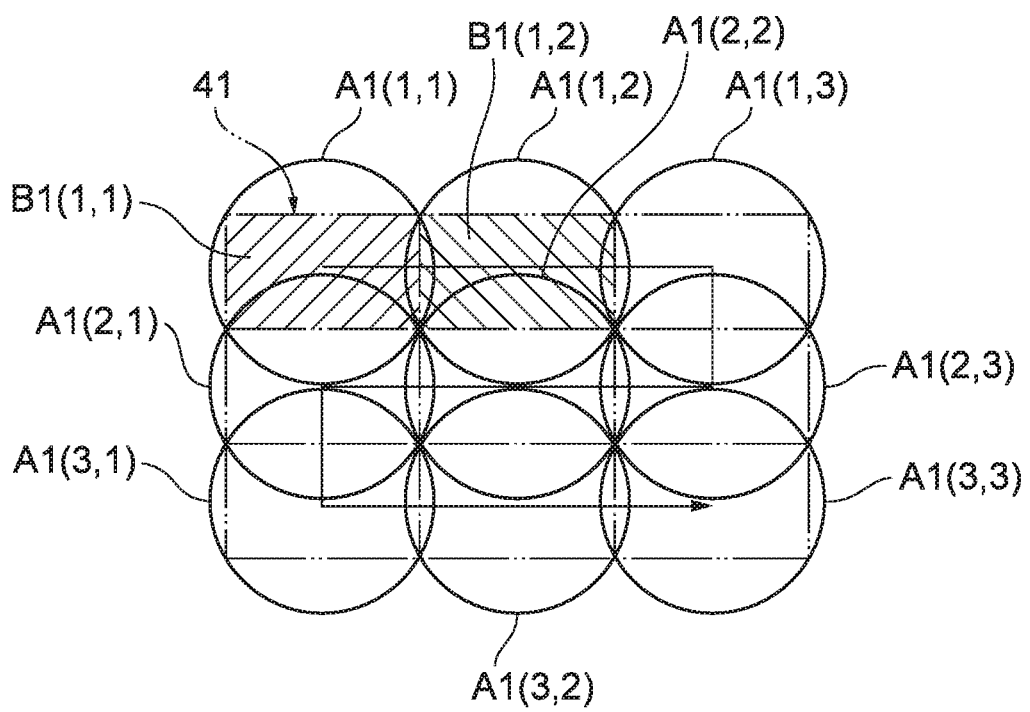
FIG. 4B illustrates a schematic diagram indicating a 2nd method of scanning a subject.

A scanning sequence is not limited to the above, and there are various types, such as a scan where moving is carried out as illustrated by an arrow in FIG. 4B. In FIG. 4B, the visual field image A1 is formed at the upper left end portion as the visual field image A1 (1, 1) with respect to the imaging surface 41 of the image pickup element 40, and the image is moved in a right horizontal direction (X1 direction) one by one up to the right end to capture the image, and then, moves downward (Y1 direction) as it is, and the visual field image A1 (2, 3) is formed to capture the image. Then, the visual field image A1 is moved one by one in a left horizontal direction to capture the left end visual field image A1 (2, 1), and is moved downward to capture the visual field image A1 (3, 1). Furthermore, the visual field image A1 is moved one by one in the right horizontal direction to be captured, and when the field image A1 (3, 3) is captured, it is possible to capture the image of the subject in the visual field range corresponding to the whole surface of the imaging surface 41. In this case, it is possible to scan and capture the subject having a range wider than the visual field range of the imaging optical system 20 at a high speed.

Figure 6:
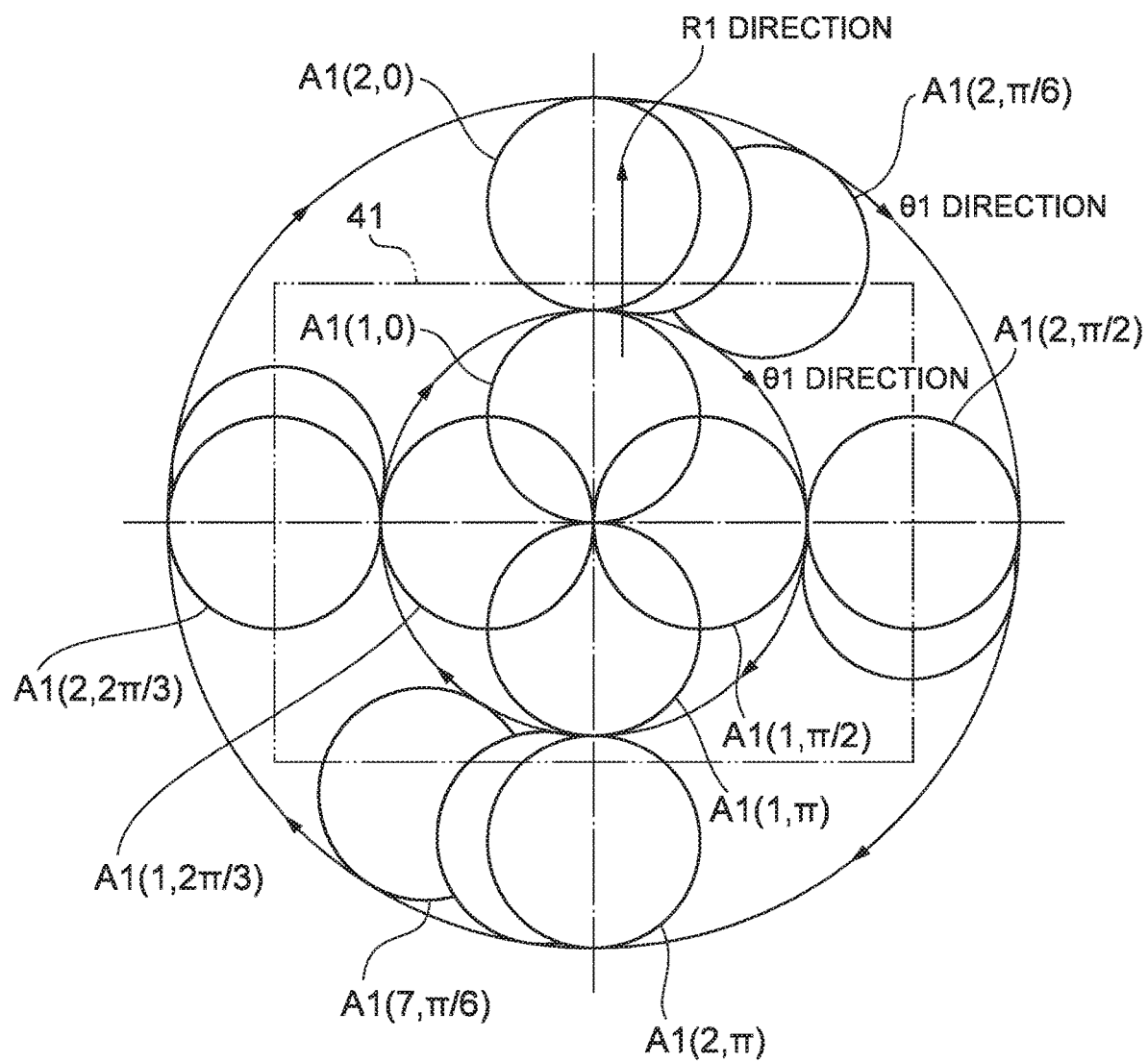
FIG. 6 illustrates a schematic diagram indicating a 3rd method of scanning a subject.

As another method of scanning and imaging a subject, there is also a method of displacing the visual field image A1 in a direction (hereinafter, referred to as θ1 direction for the purpose of description) rotating around the optical axis Z1 in a specific position of the imaging optical system 20. Namely, there is provided a method of scanning and imaging a subject around an optical axis in a specific position of the imaging optical system 20. For example, the specific position is described as a position where the optical axis Z1 passes through a center of the image pickup element 40. As illustrated in FIG. 6, with respect to visual field images A1, a visual field image A1 (1, 0) is formed and captured by the imaging optical system 20 on the imaging surface 41 of the image pickup element 40. The image A1 is moved in the θ1 direction (rotating direction), being moved one by one as A1 (1, ½*π), A1 (1, π), and A1 (1, 3/2*π) to capture the images. Thereafter, the visual field image A1 is moved in the R1 direction and further moved one by one as A1 (2, 0) to A1 (2, ⅙*π) to capture the images. In this way, it is possible to capture an image of a subject in the visual field range corresponding to the whole surface of the imaging surface 41. Incidentally, a position of a visual field image A is not limited to the above. Imaging may be carried out in optional positions such as A1 (1, ¼*π) to A1 (1, ⅙*π).

Alternatively, by moving the visual field image A along θ1 direction while moving the visual field image A along a rotating radius direction (hereinafter, referred to as R1 direction for the purpose of description), a subject image is captured by scanning. For example, as illustrated in FIG. 6, with respect to visual field images A1, a visual field image A1 (2, π) is formed by the imaging optical system 20 on the imaging surface 41 of the image pickup element 40, and is captured. The image A1 is moved in the R1 direction, and is captured one by one as A1 (1, π), A1 (1, 0) and A1 (2, 0) to capture the image. Thereafter, the visual field image A1 is moved in the θ1 direction to capture the image A1 (2, ⅙*π), while moving the visual field image A1 in the R1 direction one by one, and to capture a visual field image A1 (2, 7/6*π). After that, the visual field image A1 is moved repeatedly in the $1 direction to be moved in the R1 direction one by one. In this way, it is possible to capture an image of a subject in the visual field range corresponding to the front surface of the imaging surface 41. Incidentally, a position of a visual field image A1 is not limited to the above. Imaging may be carried out in optional positions such as A1 (3/2, π), A1 (0, 0), and A1 (3/2, 0).

When moving and imaging in the R1 direction and the θ1 direction are carried out as mentioned above, setting can be carried out easily using a polar coordinate (coordinate in the R1 direction and the θ1 direction) as coordinate parameters where the visual field image A1 is made to be displaced by oscillating-moving the imaging optical system 20 by the oscillating drive section 30, and therefore, control for the purpose of oscillating the imaging optical system 20 by the oscillating drive section 30 can be performed easily.

In the present embodiment, the imaging optical system 20 preferably satisfies condition expressed by subsequent conditional expression (1).

$$0.5 < L/BF < 1.0 \quad (1)$$

where,

L denotes a distance between the lens surface closest to the image side in the moving lens 21 and the field diaphragm 25 on the optical axis, BF denotes a distance between the lens surface closest to the image side in the moving lens 21 and the imaging surface 41 on the optical axis.

The conditional expression (1) is conditional expression for the purpose of configuring a position of the field diaphragm 25 appropriately. By the condition expressed by the conditional expression (1) being satisfied, the field diaphragm 25 is disposed at a position nearer to the image side than the medium of the lens surface closest to the image side and the imaging surface 41 in the moving lens 21, and thereby, high-accuracy imaging becomes possible.

For the purpose of exerting effects of the present embodiment suitably, it is preferable to set a lower limit of the conditional expression (1) to 0.6. On the other hand, for the purpose of exerting effects of the present embodiment suitably, it is preferable to set an upper limit of the conditional expression (1) to 0.9.

In addition, in the present embodiment, the imaging optical system 20 preferably satisfies condition expressed by subsequent conditional expression (2).

$$0 < FN^2 \times \cos(YM/SR) < 100 \quad (2)$$

where,

FN denotes F number of the imaging optical system 20,

YM denotes maximum image height in the imaging surface 41 of the image pickup element 40, and SR denotes radius of curvature of the imaging surface 41 of the image pickup element 40.

The conditional expression (2) is a conditional expression in a case where a resolution of the imaging optical system 20 is converted in an optical axis direction. By the condition expressed by the conditional expression (2) being satisfied, a resolution of the imaging optical system 20 is configured appropriately, and thereby, high-accuracy imaging becomes possible. Incidentally, the maximum image height in the imaging surface 41 of the image pickup element 40 is the maximum image height in this imaging surface 41 in the case where the image forming position formed by the imaging optical system 20 according to the object point of the same range moves along the imaging surface 41 by oscillating of the imaging optical system 20 (moving lens 21).

For the purpose of exerting effects of the present embodiment suitably, it is preferable to set an upper limit of the conditional expression (2) to 64. Furthermore, it is more preferable to set an upper limit of the conditional expression (2) to 20.

Next, an imaging method using the imaging device 10 according to the first embodiment will be described. Imaging by the imaging device 10 is performed in accordance with a prescribed remote operation by a user (imaging operation with respect to an external user interface UI). In this case, based on a prescribed control program stored in the storage unit 17, the control section 15 controls the oscillating drive section 30 and the image pickup element 40, and the oscillating drive section 30 and the image pickup element 40 operate in accordance with controlling by the control section 15. First, the oscillating drive section 30 moves the optical axis Z1 of the imaging optical system 20 in the prescribed starting direction. For example, as illustrated in FIG. 4A, the oscillating drive section 30 moves the optical axis Z of the imaging optical system 20 in a 1st direction so that the visual field image A1 formed by the imaging optical system 20 may move to the upper left end position in the imaging surface 41 of the image pickup element 40. The image pickup element 40 captures the visual field image A1 (1, 1) formed by the imaging optical system 20 moved in this 1st direction, and outputs a 1st imaging signal to the control section 15. Thereby, the image pickup element 40 outputs the imaging signal from a region included in the visual field image A1 (1, 1), for example a 1st region B1 (1, 1) of FIG. 4A and FIG. 4B, to the control section 15. The control section 15 outputs 1st image data of the 1st region B1 (1, 1) based on this imaging signal, and makes the 1st image data stored in the storage unit 17.

Next, the oscillating drive section 30 moves the optical axis Z of the imaging optical system 20 in a 2nd direction so that the visual field image A1 may move only by a prescribed distance in the right horizontal direction (X1 direction) along the imaging surface 41. Thereby, the visual field image A1 (1, 2) is formed on the imaging surface 41. In this case, position setting may be performed so that the visual field image A1 (1, 2) may be partially overlapped with the visual field image A1 (1, 1) so that a subject formed on the imaging surface 41 may not be missed. The position setting may be performed so that the 1st region B1 (1, 1) and the 2nd region B1 (1, 2) may be partially overlapped with each other. The image pickup element 40 outputs the imaging signal from a region included in this visual field image A1 (1, 2), for example a 2nd region B1 (1, 2) of FIG. 4A and FIG. 4B, to the control section 15. The control section 15 outputs 2nd image data of the 2nd region B1 (1, 2) based on this imaging signal, and makes the 2nd image data stored in the storage unit 17. As mentioned above, an image of the 1st region B1 (1, 1) in the visual field image A1 (1, 2) can be acquired, and the image data is stored in the storage unit 17.

Meanwhile, description is carried out with reference to FIG. 5 with FIG. 4A or FIG. 4B expanded. When the visual field image A1 (1, 1) is captured, an imaging signal is outputted from the 1st region B1 (1, 1) corresponding to this visual field image A1 (1, 1), and however, after outputting of this signal, a region C (1) which is inside the visual field image A1 (1, 1) and outside the 1st region B1 (1, 1) is not outputted. Therefore, a residual signal exists in this region C (1) in many cases. As the result, when an imaging signal is outputted as it is from the 2nd region B1 (1, 2) corresponding to the visual field image A1 (1, 2), the residual signal existing in the region C (1) overlapped with the visual field image A1 (1, 1) inside the 2nd region B1 (1, 2) is included, and there is a possibility that uniformity of a luminance of the image data of this part may be impaired. In other words, there is a possibility that the luminance of the region C (1) overlapped with the visual field image A1 (1, 1) inside the 2nd region B1 (1, 2) has been intensified. Then, before the imaging signal of the 2nd region B1 (1, 2) is outputted from the image pickup element 40, the control section 15 makes signals existing inside the 2nd region B1 (1, 2) outputted, and eliminates residual signals, i.e., resets signals inside the 2nd region B1 (1, 2). In other words, before the optical axis Z of the imaging optical system 20 is moved in the 2nd direction, the control section 15 outputs signals existing inside the 2nd region B1 (1, 2) to eliminate (reset) the residual signals. In other words, before making the imaging signal from the 2nd region B1 (1, 2) stored in the storage unit 17, the control section 15 makes signals existing inside the 2nd region B1 (1, 2) output, and eliminates residual signals, i.e., resets signals inside the 2nd region B1 (1, 2). In this case, the control section 15 performs a control where the residual signals outputted from the image pickup element 40 are not made to be stored in the storage unit 17.

In an interval from the imaging signal of the 1st region B1 (1, 1) being outputted while the optical axis Z of the imaging optical system 20 is moved in the 1st direction to the imaging signal of the 2nd region B1 (1, 2) being outputted while the optical axis Z is moved in the 2nd direction, the imaging optical system 20 is made to oscillate while an formed by the imaging optical system 20 has been formed in the imaging surface 41, and then, a visual field image moves on the imaging surface 41. Also in the interval of the movement, signals (electric charges) are accumulated on the image pickup element 40. Therefore, the accumulated signals become into after-image signals, and may have a bad influence on outputting of the imaging signal of the 2nd region B1 (1, 2). For this reason, outputting of the imaging signal by the image pickup element 40 is not performed in the interval of the movement, and the after-image signals accumulated in the 2nd region B1 (1, 2) in the interval of the movement are outputted once and reset, and after that, the imaging signal of the 2nd region B1 (1, 2) is outputted to the control section 15. Alternatively, there is provided a shutter interrupting a light in the imaging optical system 20, and the visual field image may not be made to be formed on the imaging surface 41 by the shutter being closed in the interval of the movement.

In resetting inside the 2nd region mentioned above, outputting (eliminating, resetting) of residual signals of the 2nd region B1 (1, 2) is made to be carried out after outputting the imaging signal in the 1st region B1 (1, 1) before outputting the imaging signal in the 2nd region B1 (1, 2), but it is not limited to this. Any timing is good before outputting the imaging signal in the 2nd region B1 (1, 2). In addition, residual signals in a partial region within the 2nd region B1 (1, 2) may be outputted (eliminated, reset). As the partial region in this case, overlapping portion of the visual field image A1 (1, 1) with the 2nd region B1 (1, 2), i.e., the region C (1) is included. Furthermore, after outputting the imaging signal in the 1st region B1 (1, 1) before outputting the imaging signal in the 2nd region B1 (1, 2), residual signals may be outputted (eliminated, reset) over the whole imaging surface 41, every time.

Thereafter, the mage pickup element 40 outputs to the control section 15 the imaging signal of the 2nd region B1 (1, 2) included in the visual field image A1 (1, 2) formed by the imaging optical system 20 having the optical axis Z moved in the 2nd direction. The control section 15 makes the 2nd image data based on this imaging signal stored in the storage unit 17. Hereinafter in the same way, imaging in each position is performed while a position of the visual field image A1 is made to move one by one, and the image data are stored in the storage unit 17 one by one. Setting of the imaging position (direction of the optical axis Z) at this time is illustrated in FIG. 4A, and is as is mentioned above. Moving of the visual field image A1 by the oscillating drive section 30 may be carried out, as illustrated in FIG. 4B mentioned above, and may be carried out as illustrated in FIG. 6. Moving other than these may be carried out. In any case, it is not necessary to make the signal outputted from the image pickup element 40 stored in the storage unit 17 at the time of reset.

The control section 15 synthesizes one of the image data having a subject image captured by the image pickup element 40 connected vertically and horizontally using two or more of the image data stored in the storage unit 17. Namely, while the 1st image data based on the imaging signal of the 1st region and the 2nd image data based on the imaging signal of the 2nd region are connected with each other one of the image data are synthesized. While the image data based on the imaging signal of the 1st region to the n-th region (n is an integer) are connected with each other, one of the image data may be synthesized. The control section 15 makes the synthesized image data stored in the storage unit 17. In addition, it is possible for the control section 15 to output the synthesized image data stored in the storage unit 17 to the external user interface UI via the input output section 16 in accordance with the user's remote operation, etc., and to make it displayed on the display section of the user interface UI. In this way, it is possible to capture, by scanning, the visual field image A1 of the imaging optical system 20 over the whole surface of the imaging surface 41 of the image pickup element 40, and capture a subject with a visual field corresponding to the whole imaging surface 41. In addition, only the image data before being synthesized, i.e., the n-the image data based on the imaging signal of the n-th region may be made to be displayed on the display section.

Figure 7:
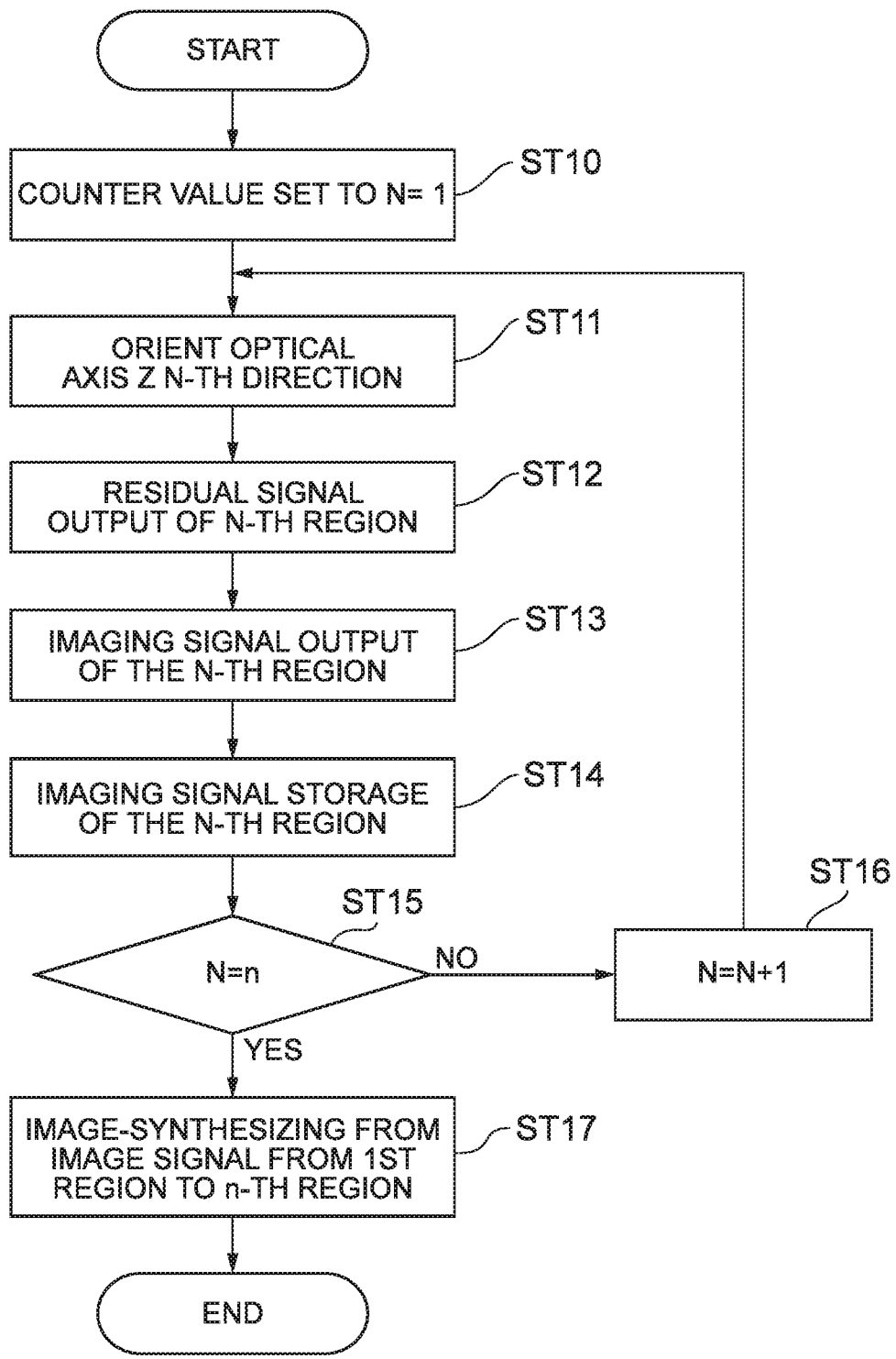
FIG. 7 illustrates a flow chart indicating a synthesizing process of image data.

Processing of the control section 15 described above will be described with reference to a flow chart illustrated in FIG. 7. As mentioned above, the control section 15 synthesizes one image data having the subject image captured by the image pickup element 40 connected vertically and horizontally using two or more of the image data stored in the storage unit 17. However, here, a case where the one image data is synthesized having the image data based on the imaging signal of the 1st region to the n-th region (n is an integer) connected with each other will be described as an example.

Since imaging and storing of the imaging signal are performed n times from the 1st region to the n-th region for this purpose, a counter value N is set to 1 for ending judgment of n times (Step ST10). Then, the control section 15 orients the optical axis Z of the imaging optical system 20 in an N-th direction (1st direction because N is set to 1, in this case) (Step ST11). Thereby, as illustrated in FIG. 4A, the visual field image A1 turns into the visual field image A1 (1, 1) located in the upper left end. The control section 15 makes the image pickup element 40 output the residual signal from the 1st region (Step ST12). The processing of Step ST12 is equivalent to the reset processing mentioned above. When completing the reset processing, the control section 15 makes the imaging signal of the 1st image captured by the imaging optical system 20 with the optical axis Z set in the 1st direction outputted (Step ST13).

The control section 15 makes the imaging signal from the 1st region outputted as described above stored in the storage unit (Step ST14).

Next, it is judged whether a value of a counter value N is n (Step ST15), and when this judgment is YES, a step proceeds to Step ST17, but a control content in this Step will be described later. On the other hand, when the judgment in Step ST15 is NO, a step proceeds to Step ST16, and 1 is added to a value of the counter value N and a step returns to Step ST11. Incidentally, in the case of the above, since the counter value N=1 when a step came to Step ST15, a step proceeds to Step ST11 while the counter value N is made to be 2 at Step ST16.

Then, at Step ST11, the control section 15 orients optical axis Z of the imaging optical system 20 in the N-th direction (2nd direction in this case, because N is set to 2). Thereby, the visual field image A1 turns into the visual field image A1 (1, 2) next on the right side. The control section 15 makes the image pickup element 40 output the residual signal from the 2nd region (Step ST12). This processing of Step ST12 is also equivalent to the reset processing mentioned above. When completing the reset processing, the control section 15 makes the imaging signal of the 2nd image captured by the imaging optical system 20 with the optical axis Z oriented in the 2nd direction outputted to the control section (Step ST13). The control section 15 makes the imaging signal outputted in this way from the 2nd region stored in the storage unit 17 (Step ST14). Next, it is judged whether a value of the counter value N is n. Hereinafter, in the same way, an operation from Step ST11 to Step ST14 is repeated until the counter value N becomes n, and when it is determined that the counter value N has become n at ST15, the storage unit 17 is in a state where n imaging signals from the 1st region to the n-th region are stored.

When it is determined that the counter value N has become n at Step ST15, a step proceeds to Step ST17. Here, the control section 15 generates one of the image data while n imaging signals from the 1st region to the n-th region stored in the storage unit 17 are made to be connect. Thereby, it is possible to synthesizing-form one image data over the whole surface of the imaging surface 41 of the image pickup element 40. Then, it is possible to output the image data synthesizing-formed in this way to the user interface UI as described above, and to be displayed on the display section, for example. Incidentally, in the above-mentioned description, although, also at the time of N=1, the after-image signal is made to be outputted and reset processing is performed, it is not necessary to perform the reset processing at the time of N=1. It is because there may be no residual signal.

Incidentally, the imaging method has been described using FIG. 4A as an example. But the imaging method is applicable also to other cases of oscillation. A region from which an imaging signal is outputted or a region from which an after-image signal is outputted is different depending on a way of oscillating.

As described above, according to the first embodiment, the moving lens 21 is configured so as to move relatively with respect to the imaging surface 41 so that the image forming position according to the object point of the same range may move along the imaging surface 41 having a concave shape. The moving lens 21 is configured so that the direction of the optical axis may change. Thereby, it is possible to secure a substantially wide visual field range even when a visual field range of the imaging optical system 20 is made to be narrow for the purpose of enhancing an image formation performance by the imaging optical system 20 small, etc. Therefore, it is possible to secure the high image formation performance by making the imaging optical system 20 small while a wide visual field range is secured.

As described above, relative oscillation movement of the moving lens 21 with respect to the imaging surface 41 may be the oscillation around a point (oscillating central point P1) which is on the optical axis Z1 of the imaging optical system 20. Thereby, aberration such as a curvature of field can also be suppressed small while the moving lens 21 is made simple, and the image formation performance can be enhanced by the imaging optical system 20 being made smaller while a wide visual field range is secured.

The imaging optical system 20 may include only the moving lens 21 as a lens. Thereby, it is possible to simplify a mechanism (oscillating drive section 30) for the purpose of oscillating-moving the moving lens 21 relatively with respect to the image pickup element 40 (device body 11).

The moving lens 21 may be oscillatably configured integrally with the field diaphragm 25. Thereby, since the visual field range of the imaging optical system 20 can be maintained at a fixed range at all times even when the moving lens 21 is made oscillated, a configuration of the imaging optical system 20 can be simplified.

Relative movement of the moving lens 21 with respect to the imaging surface 41 may be an oscillation around a position of an exit pupil of the imaging optical system 20 or the neighborhood thereof. Thereby, while the configuration of the imaging optical system 20 can be simplified since the image forming position according to the object point of the same range moves along the imaging surface 41 having a concave shape only by oscillating the moving lens 21, the image data without errors in each oscillating position can be acquired.

In addition, the relative movement of the moving lens 21 with respect to the imaging surface 41 may be an oscillation around a position of the curvature center or the neighborhood thereof of the image pickup element 40. In this case, the image data with few curvatures of field can be acquired.

Configuring may be carried out so that a position of the exit pupil and a position of the curvature center of the image pickup element 40 may be coincided. In addition, a center of the oscillation may be changed in the time of infinite photographing and short-distance photographing.

The imaging surface 41 may be curved spherically so as to have a concave surface facing an object side. Thereby, since the moving lens 21 can be made to 2-axis-oscillate around one point (oscillating central point P1) located on the optical axis Z1 of the imaging optical system 20, the mechanism (oscillating drive section 30) for the purpose of oscillating the moving lens 21 (imaging optical system 20) can be simplified.

Although the visual field range is smaller than the range of an effective acceptance surface 41 of the image pickup element 40 since the imaging optical system 20 is miniaturized, the substantially wide visual field range has been secured by moving relatively the imaging optical system 20 (moving lens 21) with respect to the imaging surface 41 and imaging a subject while being scanned vertically and horizontally. Therefore, it is possible to enhance the image formation performance by making small the imaging optical system 20 and the imaging device 10 while the wide visual field range is secured.

Configuring is carried out so that the optical axis Z1 of the imaging optical system 20 may move within the imaging surface 41 while the moving lens 21 is made to move relatively with respect to the imaging surface 41. Thereby, since the visual field range of the imaging optical system 20 can be made to be displaced in the imaging surface 41, the substantially wide visual field range can be secured by imaging the subject while being scanned vertically and horizontally.

The image pickup element 40 outputs the 1st image data of the subject image captured by the moving lens 21 in the 1st region (at the time of starting imaging) with respect to the imaging surface 41, and the 2nd image data of the subject image imaged by the moving lens 21 in the 2nd region after moving relatively with respect to the imaging surface 41. By synthesizing one of the image data using the 1st image data and the 2nd image data, a subject image captured in the substantially wide visual field range can be acquired.

Figure 8A:
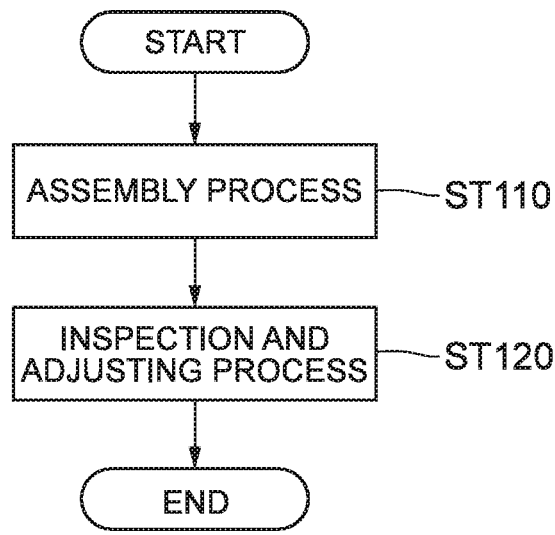
FIG. 8A illustrates a flow chart indicating a manufacturing method of the imaging device according to the first embodiment.

Next, a manufacturing method of the first embodiment according to the imaging device 10 will be described with reference to FIG. 8A and FIG. 8B. The imaging device 10 is manufactured schematically through an assembly process (Step ST110) and an inspection and adjusting process (Step ST120). In the assembly process, manufacturing and assembling of the respective components of the imaging device 10 are performed. In the inspection and adjusting process, inspection and adjusting of the imaging device 10 are performed.

Figure 8B:
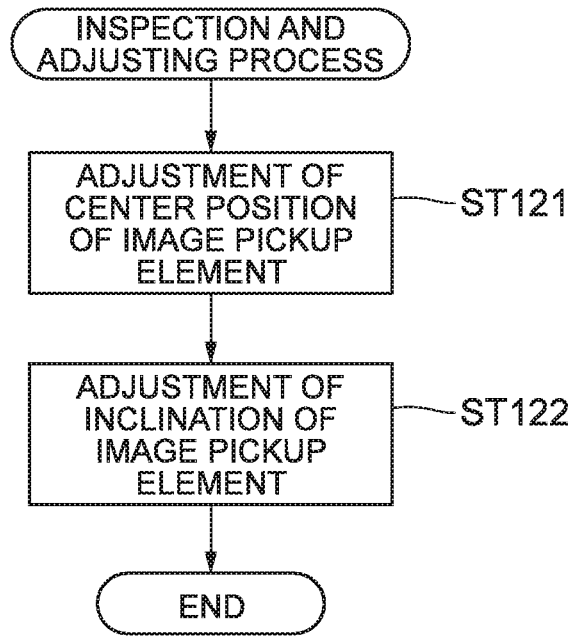
FIG. 8B illustrates a flow chart indicating details of an inspection and adjusting process in this manufacturing method.

In the inspection and adjusting process (Step ST120), a fixing position of the image pickup element 40 is adjusted as illustrated in FIG. 8B. First, a center position of the image pickup element 40 is adjusted (Step ST121). In this case, the oscillating drive section 30 is operated by a prescribed setting manipulation with respect to the user interface UI, and the imaging optical system 20 is moved to a prescribed reference position (for example, a position in a case where the optical axis Z1 of the imaging optical system 20 moves to a central part of the imaging surface 41 of the image pickup element 40). Next, a subject image is imaging-acquired as a 1st test chart in the state where the image pickup element 40 is operated by a prescribed setting manipulation and the imaging optical system is moved to the prescribed reference position. The imaging-acquired image data of the subject (1st test chart) is outputted to the external user interface UI via the input output section 16, and the image of the 1st test chart is displayed on the display section of the user interface UI.

Then, while the image of the 1st test chart displayed on the display section of the user interface UI is looked at, adjustment to move the image pickup element 40 in the direction perpendicular to the optical axis Z1 of the imaging optical system 20 is performed, and adjusting is made to be carried out so that a center portion of the imaging surface 41 may be located on the optical axis Z1 of the imaging optical system 20. For example, while the image of the 1st test chart with a reference mark formed at the position corresponding to the optical axis Z1 of the imaging optical system 20 is looked at, the image pickup element 40 is moved in the direction perpendicular to the optical axis Z1 of the imaging optical system 20, and adjusting is carried out so that this reference mark may be displayed at the center of the image. For example, while the image of the 1st test chart with a reference mark formed at one of four corners position apart equally from the optical axis Z1 of the imaging optical system 20 is looked at, the image pickup element 40 is moved in the direction perpendicular to the optical axis Z1 of the imaging optical system 20, and adjusting may be carried out so that this reference mark is displayed at one of the four corners of the image.

Next, an inclination of the image pickup element 40 is adjusted (Step ST122). As for this, as is the state where the above-mentioned adjustment has been performed, the image pickup element 40 is operated by a prescribed setting manipulation, and a subject image is imaging-acquired as a 2nd test chart. The imaging-acquired image data of the subject is outputted to the external user interface UI via the input output section 16, and the image of the 2nd test chart is displayed on the display section of the user interface UI.

Then, using position information of two or more of detection positions in the image of the 2nd test chart displayed on the display section of the user interface UI, the inclination of the image pickup element 40 is adjusted. For example, while the image of the 2nd test chart formed in an equilateral triangle is looked at, the inclination of the image pickup element 40 is adjusted so that the 2nd test chart where a position of a vertex of the equilateral triangle is equally apart from each other may be displayed. In this case, as two or more of detection positions, configured are three detection positions (for example, the position of the vertex of the triangle in the 2nd test chart) which are apart from each other by a prescribed distance with which the inclination of the image pickup element 40 can be discriminated.

The 2nd test chart is not limited to the equilateral triangle, and may also be a regular polygon, for example, and may have a shape capable of discriminating an image distortion of the 2nd test chart in accordance with the inclination of the image pickup element 40 (an inclination of a center axis of the image pickup element 40 with respect to the optical axis Z1 of the imaging optical system 20). In this case, as two or more of detection positions, vertex positions of a polygon in the 2nd test chart are configured. As two or more of detection positions, the center position of the image of the 2nd test chart and two peripheral positions apart from this center position by prescribed distances may be configured, and these can be changed appropriately.

In this way, since a center axis of the image pickup element 40 can be coincided accurately with the optical axis Z1 of the imaging optical system 20, which has been moved to the prescribed reference position, it becomes possible to scan and capture the subject accurately after this.

Two or more of detection positions are preferably three or more detection positions which are different from each other. Thereby, when positions of three points are made known, the inclination of the image pickup element 40 can be calculated, and therefore, it is possible to determine accurately whether the center axis of the image pickup element 40 is inclined with respect to the optical axis Z1 of the imaging optical system 20.

In the first embodiment mentioned above, although the image pickup element 40 is configured so as to output the 1st image data while the moving lens 21 images a subject image in the prescribed 1st position with respect to the imaging surface 41, and output the 2nd image data while the moving lens 21 is moved to the 2nd position to capture a subject image, this position-moving control has various types. For example, as illustrated in FIG. 3, there is a control which oscillates the imaging optical system 20 (moving lens 21) in accordance with switching timing by an X direction selector 47 and a Y direction selector 48 of the image pickup element 40 so that the optical axis Z1 of the imaging optical system 20 may be located within a region of a pixel 45 which transmits an electrical signal among each of pixels 45, 45, . . . of the image pickup element 40.

Then, the 2nd imaging method using the imaging device 10 according to the first embodiment will be described with reference to FIG. 9. Also in this method, in accordance with a prescribed remote operation by a user, imaging by the imaging device 10 is performed. In this case, based on a prescribed control program stored in the storage unit 17, the control section 15 controls the oscillating drive section 30 and the image pickup element 40, and in accordance with the control of the control section 15, the oscillating drive section 30 and the image pickup element 40 operate. First, the oscillating drive section 30 oscillates the imaging optical system 20 so that the optical axis Z1 of the imaging optical system 20 may be located in the region of a 1st pixel 45a which transmits an electrical signal first (for example, the 1st pixel 45a located in an upper left end in FIG. 3) among each of photoelectric conversion elements (pixel) of the image pickup element 40 (Step ST201).

Next, the image pickup element 40 starts imaging of a subject image (Step ST202). In this case, the oscillating drive section 30 oscillates the imaging optical system 20 in accordance with switching timing by the X direction selector 47 and the Y direction selector 48 of the image pickup element 40 so that the optical axis Z1 of the imaging optical system 20 may be located one by one within a region of the pixel subsequent to a 2nd pixel 45b (for example, 2nd pixel 45b which adjoins a right-hand side of the 1st pixel 45a in FIG. 3) which transmits an electrical signal in the second among each of pixels 45, 45, . . . of the image pickup element 40. In the present example, in accordance with switching timing by the X direction selector 47 and the Y direction selector 48 of the image pickup element 40, the optical axis Z1 of the imaging optical system 20 carries out scanning in the X1 direction while moving one by one in the Y1 direction with respect to each of pixels 45, 45, . . . of the image pickup element 40 (effective acceptance surface 41).

In this case, the output section 46 of the image pickup element 40 sends the image data in the region of each pixel 45 to the control section 15 one by one to store it in the storage unit 17. The control section 15 combines these of the image data in association with each position, and acquires the subject image over the whole surface of the imaging surface 41. This subject image is stored in the storage unit 17, and is outputted to the external user interface UI via the input output section 16 in accordance with user's remote operation, and can be displayed on the display section of the user interface UI.

Figure 10:
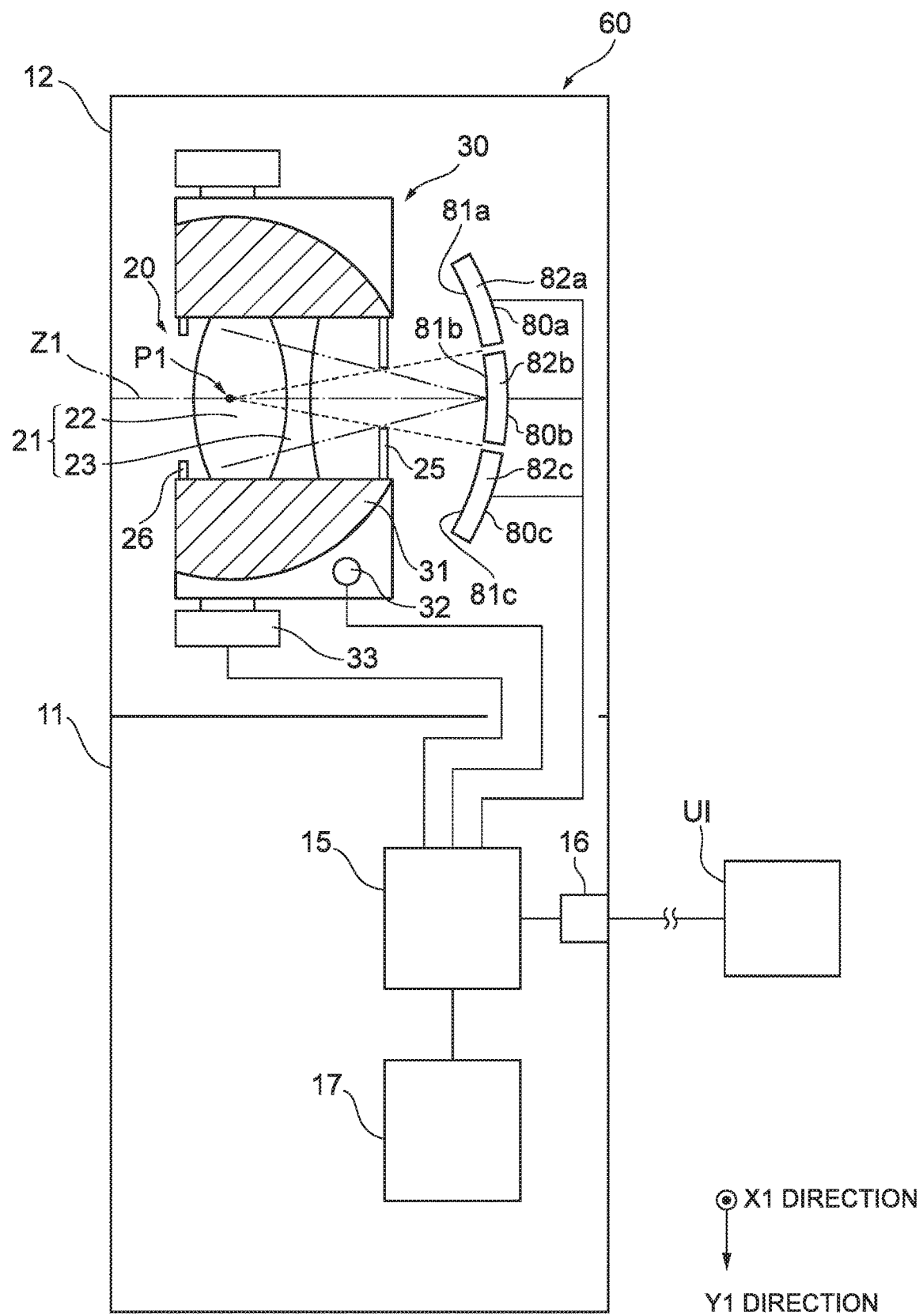
FIG. 10 illustrates a sectional view indicating a modification example of the imaging device according to the first embodiment.

In the first embodiment, although one image pickup element 40 having a spherical concave surface has been used, the configuration of the mage pickup element 40 is not limited to this. For example, as an imaging device 60 illustrated in FIG. 10, two or more of image pickup elements 80a, 80b, and 80c may be made to be provided in a line spherically. Even in this way, the same effect as the case of the first embodiment can be acquired. In addition, by making small each of the image pickup elements 80*a*, 80*b*, and 80*c*, each is easy to be configured curvedly, and manufacturing of an image pickup element becomes easy. Incidentally, many planar small image pickup elements are arranged in a concave surface shape, and the image pickup element 40 having a concave surface which becomes spherical as a whole may be configured.

In the image pickup elements 80*a*, 80*b*, and 80*c*, imaging surfaces 81*a*, 81*b*, and 81*c* which have photoelectric conversion elements 82*a*, 82*b*, and 82*c* which are made up of a CCD and a CMOS, etc. are formed on the surface, respectively, and while the image light of the subject formed by the imaging optical system 20 is photo-electrically converted by the photoelectric conversion elements 82*a*, 82*b*, and 82*c*, imaging data are generated, and this is sent to the control section 15. In this case, in the same way as the manufacturing method described in the first embodiment mentioned above, in the inspection and adjusting process (Step ST120), the same effect as the case of the first embodiment can be acquired by inspecting and adjusting individually fixing positions of each of the image pickup elements 80*a*, 80*b*, and 80*c*.

In the first embodiment, although the imaging surface 41 is curved spherically so as to have a concave surface facing an object side, it is not limited to this, and for example, the imaging surface 41 may be curved in a shape of a aspheric surface, and may be curved in a shape of a hyperboloid. Namely, the imaging surface 41 can be made to have various shapes curved so as to have a concave surface facing an object side in a cross section of both directions of X1 and Y1 which are orthogonal to a direction along the optical axis Z1 of the imaging optical system 20.

Without being limited to the above, an imaging surface is curved so as to have a concave surface facing an object side in a cross section viewed from the 1st direction (X1 direction), and may be formed so as to be not curved (in a planar shape) in a cross section viewed from the 2nd direction (Y1 direction). Namely, the imaging surface may be formed in a cylindrical shape. In this case, an image surface of an imaging optical system is curved so as to have a concave surface facing an object side in a cross section viewed from the 1st direction, and however, is designed so as to come close to a non-curved plane in a cross section viewed from the 2nd direction. In addition, relative movement with respect to the imaging surface of the moving lens is an oscillation in a cross section viewed from the 1st direction, and is a parallel displacement in a cross section viewed from the 2nd direction. An oscillating drive section 130 can also drive the imaging optical system in a direction perpendicular to an optical axis direction and an optical axis of the imaging optical system.

In the first embodiment, although the moving lens 21 is configured by 1 set of cemented lenses with the positive lens 22 and the negative lens 23 cemented in order from the object side, it is not limited to this. For example, the moving lens 21 is configured by 1 set of cemented lenses with the negative lens and the positive lens cemented in order from the object side. The moving lens 21 may be configured by three or more lenses without being limited to two lenses. The imaging optical system 20 may be configured by being provided with lenses other than the moving lens 21 (fixed lens, for example). In addition, the moving lens 21 may be configured by two or more groups of lenses without being limited to one group of lenses.

In the first embodiment, although the aperture stop 26 is oscillatably configured integrally with the moving lens 21, it is not limited to this, and when a position on the optical axis Z1 of the aperture stop 26 is configured in the position of the oscillating central point P1 or the neighborhood thereof, the aperture stop 26 does not need to oscillate.

In the first embodiment, although the oscillating central point P1 is configured on the optical axis Z1 of the imaging optical system 20, included is one disposed in a position apart a little from the optical axis Z1 of the imaging optical system 20 due to manufacturing errors, etc., without being limited to on the optical axis Z1 of the imaging optical system 20.

In the first embodiment, although the imaging device 10 is made to be a fixed type imaging device which can be used as a monitor camera, etc., it is not limited to this, and for example, the imaging device 10 may be used as an imaging device of an endoscope, and may be used as a camera incorporated in a portable terminal etc., a digital still camera, and a digital single lens reflex camera, etc. When the imaging device 10 is used for an endoscope for example, a wide angle image data with a visual field range wide can be acquired even when an attitude of an endoscope itself is not changed by pan tilt, etc.

Figure 11:
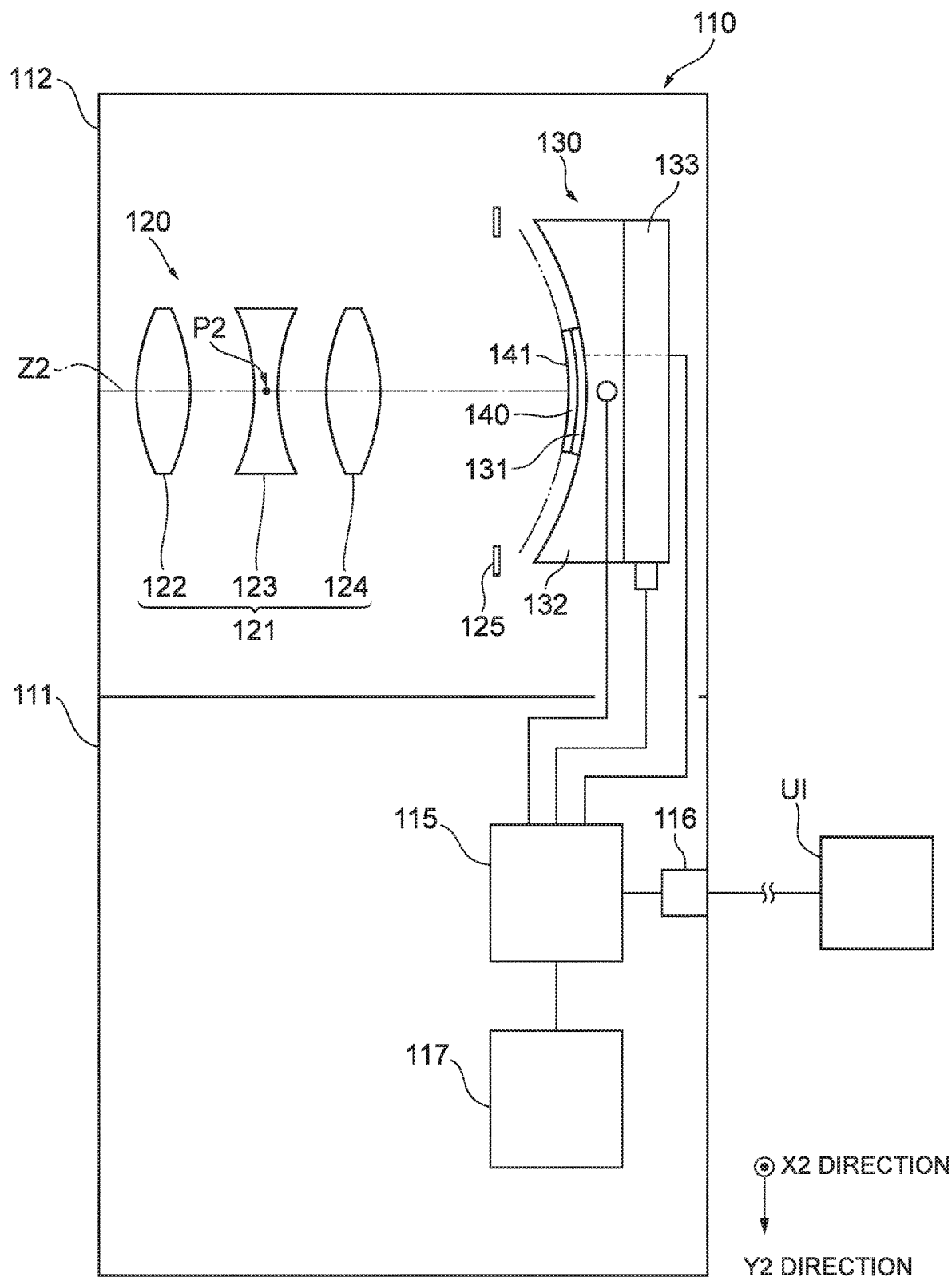
FIG. 11 illustrates a sectional view of an imaging device according to a second embodiment.

Next, an imaging device 110 provided with an imaging optical system 120 of a second embodiment will be described with reference to FIG. 11. FIG. 11 illustrates a sectional view of a fixed type imaging device 110 which can be used as a monitor camera, etc. The imaging device 110 is configured mainly by a device body 111 and a lens barrel section 112, an imaging optical system 120 which is housed and held in a lens barrel section 112, an image pickup element 140 housed in the lens barrel section 112, an oscillating drive section 130 which can hold and oscillate an image pickup element 140, and a control section 115 housed in the device body 111.

The imaging optical system 120 makes an image of a subject (physical object) formed on an imaging surface 141 of the image pickup element 140. The image pickup element 140 converts photo-electrically a light from the subject formed on the imaging surface 141 by the imaging optical system 120, and outputs subject's image data to the control section 115. The oscillating drive section 130 is made to make it possible to oscillate relatively the image pickup element 140 including imaging surface 141 with respect to the imaging optical system 120, and move the imaging surface 141 of the image pickup element 140 along an image surface of the imaging optical system 120.

The image pickup element 140 is configured using an image sensor such as a CCD and a CMOS for example. On a surface of the image pickup element 140, the imaging surface 141 with a pixel (photoelectrical conversion device) disposed in two-dimensionally is formed. The imaging surface 141 is curved spherically so as to have a concave surface facing an object side, and is formed while the image surface of the imaging optical system 120 is curved along the imaging surface 141. In the present embodiment, the range of the imaging surface 141 (effective acceptance surface) of the image pickup element 140 is a range smaller than a visual field range of the imaging optical system 120. Namely, the image pickup element 140 smaller than a visual field image corresponding to the visual field range of the imaging optical system 120 is used.

To the control section 115, the image pickup element 140 and the oscillating drive section 130, an input output section 116 provided in the outside of the device body 111, and the storage unit 117 housed in the device body 111 are electrically connected. The input output section 116 is configured so as to be connectable electrically with a user interface UI provided in the outside of the imaging device 110. Since a configuration and a function of the input output section 116 are the same as those of the first embodiment, descriptions thereof are omitted, and however, the subject image captured by the imaging device 110 can be displayed in a display section of the user interface UI. The storage unit 117 stores data necessary for operating of the image pickup element 140, etc., and the subject's image data imaging-acquired by the image pickup element 140. The Control section 115 controls each of the image pickup element 140, the oscillating drive section 130, the input output section 116, and the storage unit 117, etc. In addition, the control section 115 can perform various image processing with respect to the subject's image data imaging-acquired by the image pickup element 140.

Next, the imaging optical system 120 and the oscillating drive section 130 will be described. The imaging optical system 120 is configured by being provided with an imaging lens 121 and a field diaphragm 125. The imaging lens 121 is configured by a 1st positive lens 122 which is a single lens, a negative lens 123 which is a single lens, and a 2nd positive lens 124 which is a single lens, which are disposed along an optical axis in order from the object side, for example. The image pickup element 140 is relatively oscillatable with respect to the imaging lens 121 by the oscillating drive section 130. In the embodiment 2, only this imaging lens 121 is a lens included in the imaging optical system 120.

The field diaphragm 125 is disposed between the 2nd positive lens 124 and the image pickup element 140, and a visual field range of the imaging optical system 120 is larger than a range of the imaging surface 141 of the image pickup element 140. The field diaphragm 125 is preferably disposed at a position nearer to the image side than the medium of the lens surface closest to the image side and the imaging surface 141 in the moving lens 121. Thereby, high-accuracy imaging becomes possible. Although detailed illustration of an aperture stop (not illustrated) for the purpose of determining a brightness (F number) of the imaging optical system 120 is omitted, a lens frame holding the imaging lens 121 functions as the aperture stop, for example. In addition, the aperture stop may be disposed at the neighborhood of the object side of the imaging lens 121.

The oscillating drive section 130 is configured by being provided with a sensor holding section 131, a 1st drive section 132, and a 2nd drive section 133. The sensor holding section 131 is configured so that 2-axis-oscillation around an oscillating central point P2 set on an optical axis Z2 of the imaging optical system 120 may be possible using a guide mechanism, etc. in a state where the image pickup element 140 is held. The 1st drive section 132 and the 2nd drive section 133 are provided for the purpose of this 2-axis-oscillation, and the image pickup element 140 can 2-axis-oscillate around the oscillating central point P2 with respect to the imaging lens 121 and the field diaphragm 125. In this way, the imaging optical system 120 is configured so that an image formed by the imaging optical system 120 may be formed along a concave surface which will be an oscillation trajectory of the imaging surface 141 at the time of the image pickup element 140 being oscillated.

A position of the oscillating central point P2 is set at a position of an exit pupil or the neighborhood thereof of the imaging optical system 120, and is set at a position of a curvature center or the neighborhood thereof of a concave surface which will be an oscillation trajectory of the imaging surface 141 at the time of the image pickup element 140 being oscillated.

The 1st drive section 132 is made up using a servo motor, etc., and oscillates the sensor holding section 131 and the image pickup element 140 around a 1st oscillation axis which is orthogonal to a direction along the optical axis Z2 of the imaging optical system 120, and passes through the oscillating central point P2 while extending in a direction (referred to as X2 direction) orthogonal to a paper surface of FIG. 11, for example. The 2nd drive section 133 is made up using a servo motor, etc., and oscillates the image pickup element 140, the sensor holding section 131, and the 1st drive section 132 around a 2nd oscillation axis which is orthogonal to a direction along the optical axis Z2 of the imaging optical system 120, and passes through the oscillating central point P2 while extending in a direction (referred to as Y2 direction) orthogonal to an X2 direction, for example. A guide mechanism of the sensor holding section 131 in the oscillating drive section 130 is curved so as to have a spherical concave surface facing an object side, namely, so as to have a concave surface facing an object side in a cross section viewed from the X2 direction and is curved so as to have a concave surface facing an object side in a cross section viewed from the Y1 direction.

In this way, by operating the 1st drive section 132 and the 2nd drive section 133 while being combined, it is possible to 2-axis-oscillate the image pickup element 140 around the oscillating central point P2. Therefore, the imaging optical system 120 is configured so that the subject image by the imaging optical system 120 may be formed while being overlapped with the spherical concave surface which will be the oscillation trajectory of the imaging surface 141. Thereby, by oscillating the image pickup element 140 by the oscillating drive section 130, the subject image corresponding to the visual field range of the imaging optical system 120 over a range wider than the range of the imaging surface 141 can be scanned and captured.

Figure 12A:
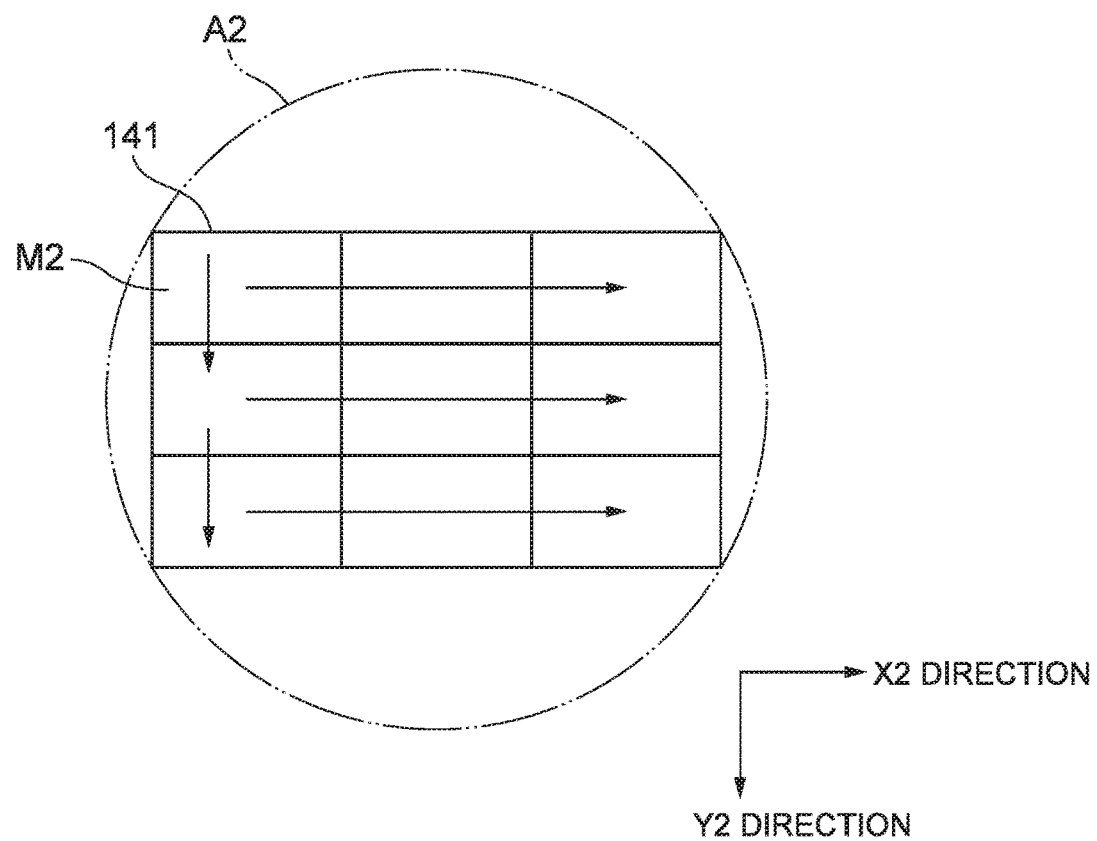
FIG. 12 A illustrates a schematic diagram indicating a 1st method of scanning a subject in the second embodiment, and FIG. 12 B illustrates a schematic diagram indicating a 2nd method of scanning a subject.

In the present embodiment, the image pickup element 140 is oscillated by the oscillating drive section 130, and the imaging surface 141 of the image pickup element 140 is made to displace two-dimensionally along a direction orthogonal to a direction along the optical axis Z2 of the imaging optical system 120, and a subject can be captured while being scanned vertically and horizontally. For example, as illustrated in FIG. 12A, the imaging surface 141 of the image pickup element 140 is made to move by one frame (range corresponding to one imaging surface) from the left end to the right end in the X2 direction with respect to a visual field image A2 of the imaging optical system 120, and after moving by one frame downwards in the Y2 direction after returning to the left, a control of moving by one frame from the left end to the right end in the X2 direction is repeated, and a subject can be captured while being scanned vertically and horizontally. Thereby, the subject image larger than the range of the imaging surface 141 of the image pickup element 140, which is formed by the imaging optical system 120, can be scanned and captured accurately.

Figure 12B:
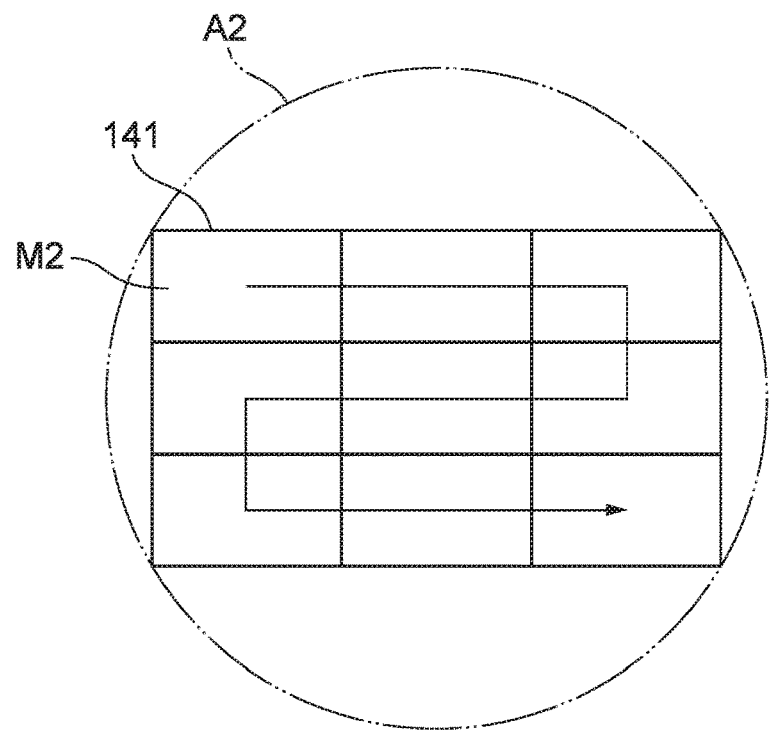

As illustrated in FIG. 12B, the round trip scan that the imaging surface 141 of the image pickup element 140 is made to move by one frame from the upper left to the right end in the X2 direction with respect to the visual field image A2 of the imaging optical system 120, and is made to move then by one frame up to the left end in the X2 direction after moving by one frame downwards in the Y2 direction, may be made to be carried out. In the same way also in this case, the subject image larger than the range of the imaging surface 141 of the image pickup element 140, which is formed by the imaging optical system 120, can be scanned and captured accurately.

Figure 13:
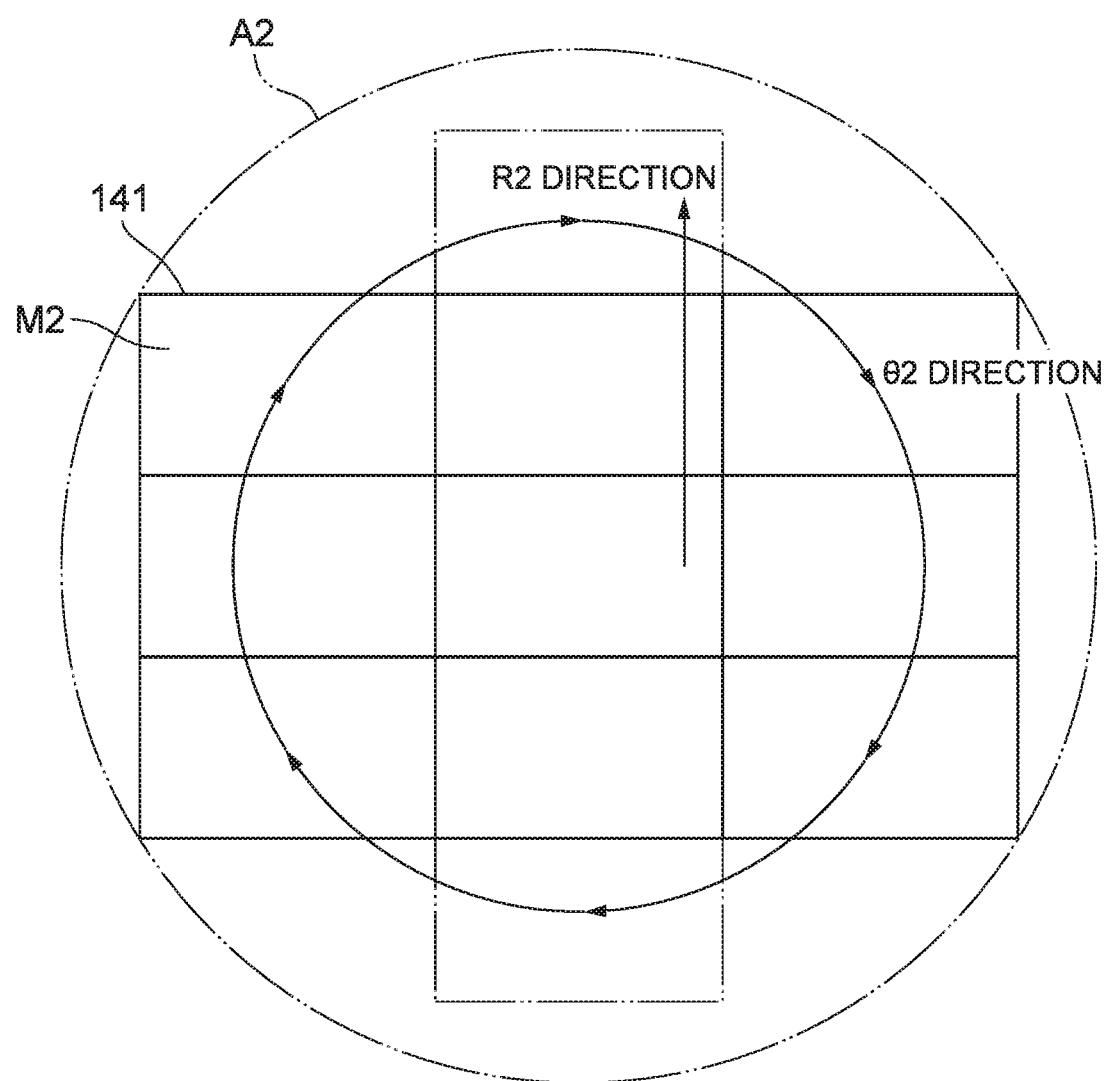
FIG. 13 illustrates a schematic diagram indicating a 3rd method of scanning a subject.

A method to scan and image a subject is not limited to the method mentioned above, and the image pickup element 140 is oscillated by the oscillating drive section 130, and the imaging surface 141 of the mage pickup element 140 is made to be displaced in a direction (hereinafter, referred to as θ2 direction for description) rotating along optical axis Z2 of the imaging optical system 120, and a subject may be scanned and captured around the optical axis. For example, as illustrated in FIG. 13, the imaging surface 141 of the image pickup element 140 is made to be displaced along the θ2 direction while being moved along a direction (hereinafter, referred to as an R2 direction for description) along a rotating radius of the imaging surface 141 of the image pickup element 140 with respect to the visual field image A2 of the imaging optical system 120, and thereby, a subject may be scanned and captured around the optical axis. Thereby, since a polar coordinate (coordinate of R2 direction and θ2 direction) can be used as a coordinate parameter to displace the imaging surface 141 of the image pickup element 140, control for the purpose of oscillating the image pickup element 140 by the oscillating drive section 130 can be performed easily.

Next, an imaging method using the imaging device 110 according to the second embodiment will be described. Also here, in accordance with a prescribed remote operation by a user (imaging operation with respect to an external user interface UI), imaging by the imaging device 110 is performed. In this case, the control section 115 controls the oscillating drive section 130 and the image pickup element 140 based on a prescribed control program stored in the storage unit 117, and the oscillating drive section 130 and the image pickup element 140 operate in accordance with the control of the control section 115. First, the oscillating drive section 130 oscillates and stops the image pickup element 140 so that the imaging surface 141 of the image pickup element 140 may be displaced to a prescribed starting position, for example, a position where the imaging surface 141 of the image pickup element 140 is overlapped with one end portion of the X2 direction and the Y2 direction (upper left end in FIG. 12A) in the visual field image A2 of the imaging optical system 120, as illustrated in FIG. 12A. The image pickup element 140 captures a subject image in a starting state (1st state) where the imaging surface 141 of the image pickup element 140 is located in the starting position, and outputs the image data (1st image data) captured in the starting state to the control section 115.

The oscillating drive section 130 oscillates and stops the image pickup element 140 so that the imaging surface 141 of the image pickup element 140 may be displaced to an oscillating position oscillated by a prescribed distance to the X2 direction (by just one frame corresponding to a width of the imaging surface 141) along the image surface of the imaging optical system 120 from the starting position, for example, a position displaced to the right by one frame from a position of the upper left end in FIG. 12A (position overlapped partially may be acceptable at this time). The image pickup element 140 captures a subject image formed by the imaging surface 141 in this position, and outputs the image data (2nd image data) to the control section 115.

Hereinafter, the oscillating drive section 130 repeatedly moves the imaging surface 141 of the image pickup element 140 by one frame while carrying out scanning vertically and horizontally as mentioned above, and captures a subject image formed on the imaging surface 141 at the position in each case at the time, and outputs the image data (2nd image data) to the control section 115. In this way, imaging of the subject image formed by the imaging optical system 120 and outputting of the image data are repeated by the image pickup element 140 until the imaging surface 141 of the image pickup element 140 reaches the other end side in the X2 direction in the visual field image A2 of the imaging optical system 120.

The control section 115, while connecting vertically and horizontally in accordance with scanning movement two or more of the image data acquired by scanning the image pickup element 140 vertically and horizontally as mentioned above, synthesizes one image data used as the entire image of a subject, and makes this stored in the storage unit 117. The control section 115 outputs the image data stored in the storage unit 117 to an external user interface UI via the input output section 116 in accordance with remote operation of a user, and makes the subject image displayed on a display section of the user interface UI.

As described above, according to the second embodiment, the image pickup element 140 including the imaging surface 141 is configured movable relatively with respect to the imaging lens 121 so that an image forming position in accordance with an object point of the same range by the imaging optical system 120 may move along a concave surface which will be an oscillation trajectory of the imaging surface 141. Thereby, a subject image of a large range formed by the imaging optical system 120 can be captured using a small image pickup element 140. In this case, an oscillation trajectory of the imaging surface 141 draws a spherical concave surface facing an object side by the oscillating drive section 130, and a center of this spherical surface is configured at a position of the exit pupil or the neighborhood thereof of the imaging optical system 120, and therefore, an image formed by the imaging optical system 120 can be captured while curvature of field etc. is suppressed, and a high image formation performance can be acquired.

The imaging surface 141 curves spherically so as to have a concave surface facing an object side. Thereby, when the imaging surface 141 is moved along the spherical surface, what is necessary is just to make the image pickup element 140 2-axis-oscillate, and a mechanism (oscillating drive section 130) and control for oscillating the image pickup element 140 including the imaging surface 141 can be simplified.

In the second embodiment, although the imaging surface 141 is curved spherically so as to have a concave surface facing an object side it is not limited to this, and, the imaging surface 141 may be curved in a shape of a aspheric surface, and may be curved in a shape of a hyperboloid, for example.

An imaging surface may be formed so as to be curved to have a concave surface facing an object side in a cross section viewed from 1st direction (X2 direction), and so as not to be curved (planate) in a cross section viewed from the 2nd direction (Y2 direction). In this case, relative movement with respect to an imaging lens of an image pickup element becomes an oscillation in a cross section viewed from the 1st direction, and becomes parallel movement in a cross section viewed from the 2nd direction.

In the second embodiment, although the imaging lens 121 is made up from three lenses, it is not limited to this, and the imaging lens 121 may be made up from two lenses, or four or more lenses, for example. In addition, the imaging optical system 120 may be configured by being provided with another lens other than the imaging lens 121.

In the second embodiment, the oscillating central point P2 is set on the optical axis Z2 of the imaging optical system 120, and however, may be disposed at a position apart a little from the optical axis Z2 of the imaging optical system 120 due to manufacturing errors, etc.

In the second embodiment, although the imaging device 110 is made to be a fixed type imaging device which can be used as a monitor camera, etc., it is not limited to this, and the imaging device 110 may be used as an imaging device of an endoscope, and may be used as a camera incorporated in a portable terminal etc., a digital still camera, and a digital single lens reflex camera, etc., for example. Incidentally, when the imaging device 110 is used as a digital single lens reflex camera, an oscillating drive section may configure the image pickup element 140 so as to be oscillatable by a desired oscillation trajectory in accordance with control of a control section using a gimbal mechanism and an XYZ stage, etc. In this way, by storing a control program corresponding to a type of exchangeable imaging optical system (interchangeable lens) in a storage unit, the oscillating drive section can switch an oscillation trajectory of the image pickup element 140 in accordance with a type (shape of image surface) of the imaging optical system.

In addition, the first embodiment and the second embodiment may be combined with each other. Namely, both of the imaging optical system and the image pickup element may be driven. In this case, the imaging optical system and the image pickup element may be moved in the same direction, and it may move in the different direction. In this case, a small imaging device may be used. In addition, a driving amount of a lens can be suppressed. Furthermore, the imaging device may be configured by combining constituent elements of each embodiment suitably.

EXAMPLE

1st Example

Figure 14:
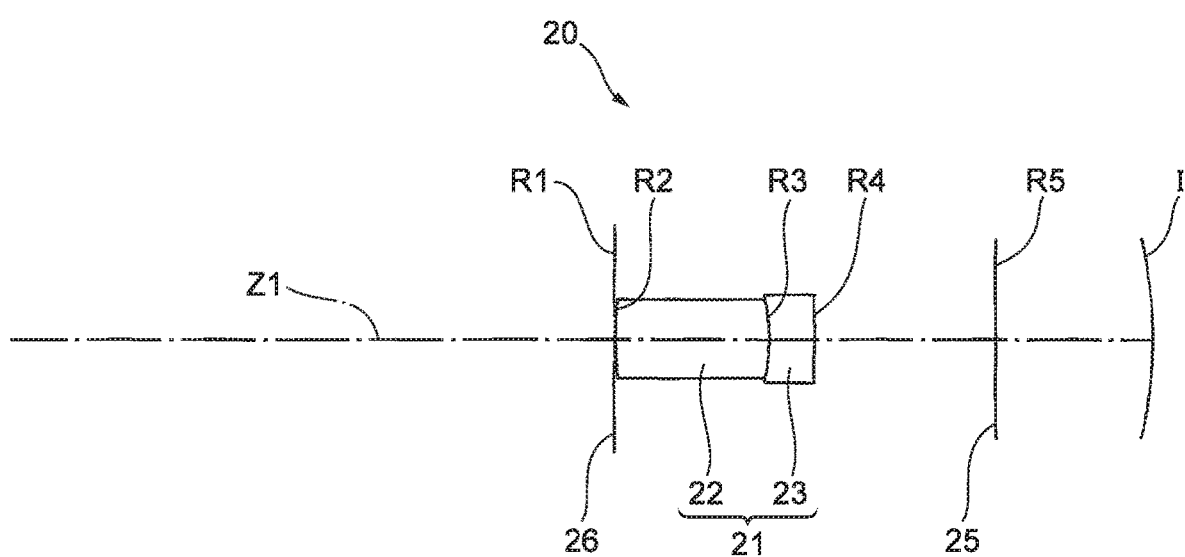
FIG. 14 illustrates a lens configuration drawing indicating an example of the imaging optical system according to the first embodiment.

Hereinafter, examples of the imaging optical system 20 according to the first embodiment will be described based on appended drawings. First, a 1st example of the imaging optical system 20 according to the first embodiment will be described using FIG. 14 and FIG. 15, and Table 1. FIG. 14 illustrates a lens configuration of the imaging optical system 20 according to the 1st example. The imaging optical system 20 according to the 1st example is configured by being provided with the moving lens 21, the field diaphragm 25, and the aperture stop 26.

The moving lens 21 is configured by 1 set of cemented lenses having the positive lens 22 and the negative lens 23 cemented in order from the object side. The field diaphragm 25 is disposed in an image side rather than the moving lens 21 side, and a visual field range of the imaging optical system 20 is a range smaller than the range of the imaging surface 41 (refer to FIG. 1) of the image pickup element 40. The aperture stop 26 for the purpose of determining a brightness (F number) of the imaging optical system 20 is disposed in the neighborhood of an object side of the moving lens 21.

Hereinafter, Table 1 to 3 are indicated, and these are tables having values of specifications of the imaging optical system 20 according to the 1st to the 3rd example indicated, respectively. In [overall specifications] of each table, a focal length f of the imaging optical system 20, a distance L on the optical axis between the field diaphragms 25 and the lens surface closest to the image side in the moving lens 21, a distance BF on the optical axis between the imaging surfaces 41 (image surface I) and the lens surface closest to the image side in the moving lens 21, a F number FN of the imaging optical system 20, the maximum image height YM in the imaging surface 41 of the image pickup element 40, a radius of curvature SR of the imaging surface 41 (image surface I) of the image pickup element 40, and a value of the maximum image height YO of the imaging optical system 20 are illustrated, respectively. In addition, in [lens specifications], the 1st column (surface number) denotes a number of a lens surface at the time of counting from the object side, the 2nd column R denotes a radius of curvature of a lens surface, the 3rd column D denotes an interval of a lens surface on the optical axis, the 4th column nd denotes a refractive index with respect to d line (wavelength $\lambda$=587.6 nm), and the 5th column vd denotes Abbe number with respect to d line (wavelength $\lambda$=587.6 nm), respectively. A radius of curvature "∞" denotes a plane, and as for a refractive index of air nd=1.000000, the indication is omitted. In [conditional expression corresponding value], a corresponding value of each conditional expressions is denoted.

Although "mm" is commonly used as to a unit of the focal length f, the radius of curvature R, and other length which are indicated in all the following specifications values, it is not limited to this because an equivalent optical performance is acquired as for an optical system even when proportional expansion or proportional contraction is carried out. Also in the specification values in the 2nd example to the 3rd example as described below, the same reference sign as the present example will be used.

In Table 1 indicated below, each of specifications in the 1st example are indicated. The radius of curvature R of the 1st surface to the 5th surface in Table 1 corresponds to reference signs R1 to R5 which are denoted to the 1st surface to the 5th surface in FIG. 14, respectively.

TABLE 1

[Overall specifications]

| | |
|---|---|
| f | 5 |
| L | 2.4 |
| BF | 3.75277 |
| FN | 9 |
| YM | 4.05 |
| SR | −5 |
| YO | 1 |

[Lens specifications]

| Surface number | R | D | nd | vd | |
|---|---|---|---|---|---|
| Object surface | ∞ | ∞ | | | |
| 1 | ∞ | 0.0000 | | | (Aperture stop) |
| 2 | 3.3194 | 1.7000 | 1.658440 | 50.84 | |
| 3 | −2.1131 | 0.5000 | 1.755200 | 27.57 | |
| 4 | −14.8694 | 2.4000 | | | |
| 5 | ∞ | 1.35277 | | | (Field diaphragm) |
| Image surface | −5.00000 | | | | |

[Conditional expression corresponding value]

Conditional expression (1)   L/BF = 0.63953
Conditional expression (2)   $FN^2 \times \cos(YM/SR)$ = 55.84937

In this way, in the present example, it turns out that the above-mentioned conditional expressions (1) to (2) are all fulfilled.

Figure 15:
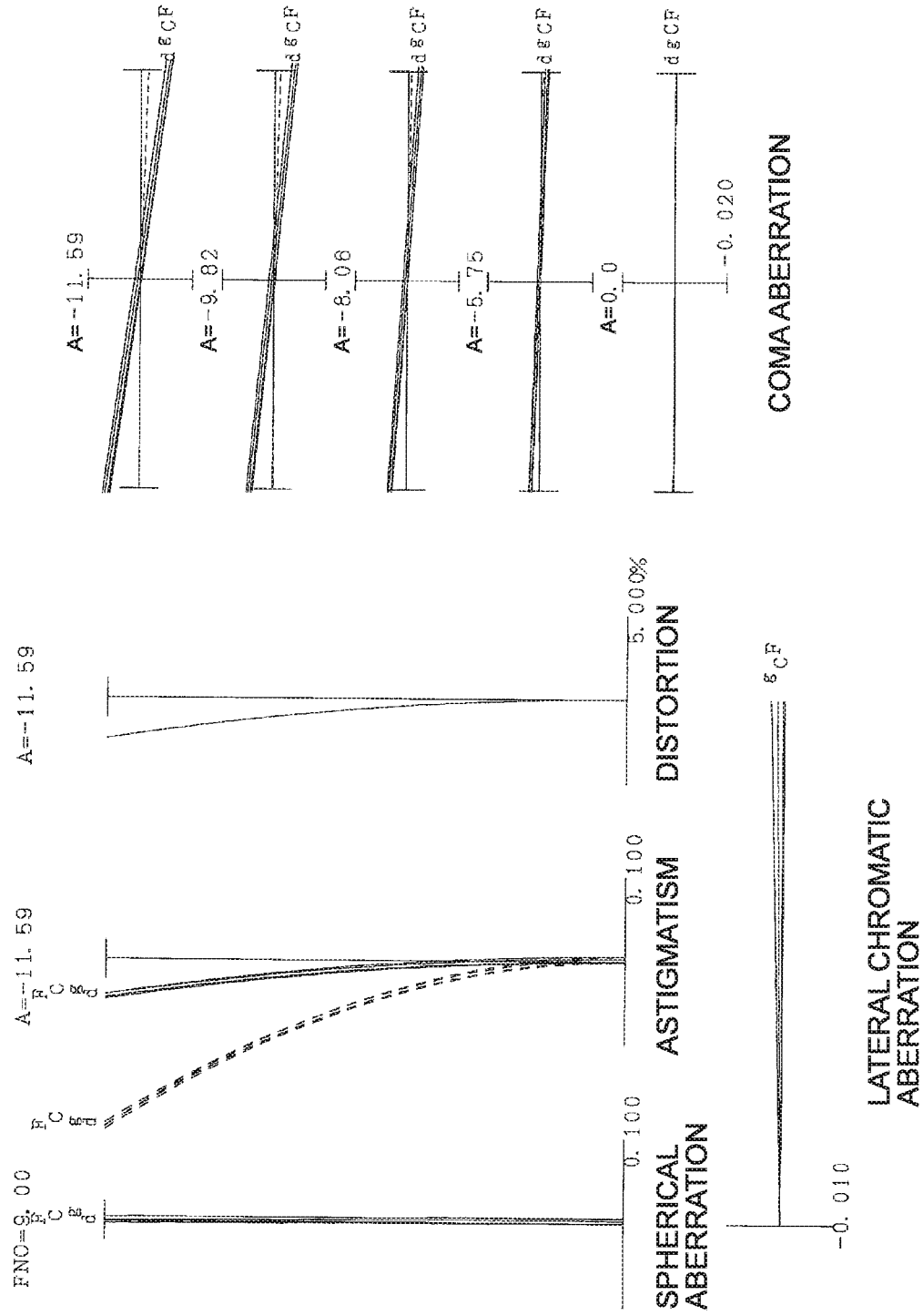
FIG. 15 illustrates a graphs showing various aberrations with respect to a 1st example of the imaging optical system according to the first embodiment.

FIG. 15 illustrates graphs showing various aberrations of the imaging optical system 20 according to the 1st example.

In each of the aberration graphs, FNO denotes an F number, and A denotes a half surface angle, respectively. In each of aberration graphs, d denotes an aberration in a d line (λ=587.6 nm), g denotes an aberration in a g line (λ=435.8 nm), C denotes an aberration in a C line (wavelength λ=656.3 nm), and F denotes an aberration in an F line (wavelength λ=486.1 nm), respectively. In an aberration graph illustrating an astigmatism, a solid line illustrates a sagittal image surface and a dashed line illustrates a meridional image surface. Hereinafter, descriptions of aberration graphs are similar also in other examples.

It is understood from each of aberration graphs that the 1st example has various aberrations corrected satisfactory, and has an excellent optical performance. As a result, also in the imaging device 10, an excellent optical performance can be secured by incorporating the imaging optical system 20 of the 1st example.

2nd Example

Next, a 2nd example of the imaging optical system 20 according to the first embodiment will be described using FIG. 16 and Table 2. The imaging optical system 20 of the 2nd example has the same configuration as the imaging optical system 20 of the 1st example illustrated in FIG. 14, and detailed descriptions and illustrations are omitted.

In Table 2 indicated below, each of specifications in the 2nd example are indicated. A radius of curvature R of the 1st surface to the 5th surface in Table 2 correspond to reference signs R1 to R5 given to the 1st surface to the 5th surface in FIG. 14, respectively.

TABLE 2

[Overall specifications]

| | |
|---|---|
| f | 5 |
| L | 2 |
| BF | 3.75277 |
| FN | 5 |
| YM | 4.05 |
| SR | −5 |
| YO | 1 |

[Lens specifications]

| Surface number | R | D | nd | vd | |
|---|---|---|---|---|---|
| Object surface | ∞ | ∞ | | | |
| 1 | ∞ | 0.0000 | | | (Aperture stop) |
| 2 | 3.3194 | 1.7000 | 1.658440 | 50.84 | |
| 3 | −2.1131 | 0.5000 | 1.755200 | 27.57 | |
| 4 | −14.8694 | 2.0000 | | | |
| 5 | ∞ | 1.75277 | | | (Field diaphragm) |
| Image surface | −5.00000 | | | | |

[Conditional expression corresponding value]

| | |
|---|---|
| Conditional expression (1) | L/BF = 0.53294 |
| Conditional expression (2) | FN² × cos(YM/SR) = 17.23746 |

In this way, in the present example, it turns out that the above-mentioned conditional expressions (1) to (2) are all fulfilled.

Figure 16:
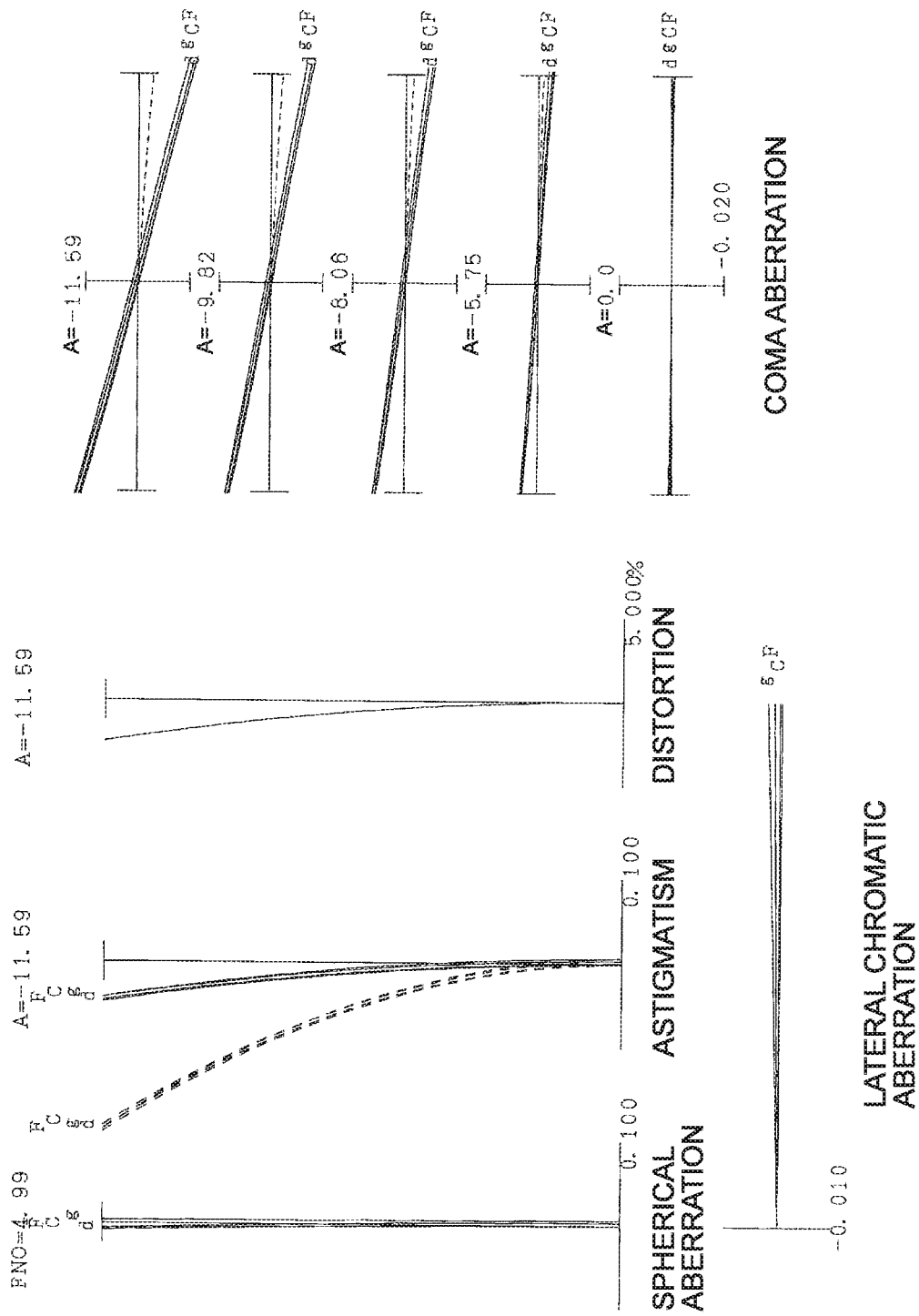
FIG. 16 illustrates a graphs showing various aberrations with respect to a 2nd example of the imaging optical system according to the first embodiment.

FIG. 16 illustrates graphs showing various aberrations of the imaging optical system 20 according to the 2nd example. It is understood from each of aberration graphs that the 2nd example has various aberrations corrected satisfactory, and has an excellent optical performance. As the result, also in the imaging device 10, an excellent optical performance can be secured by incorporating the imaging optical system 20 of the 2nd example.

3rd Example

Next, the 3rd example of the imaging optical system 20 according to the first embodiment will be described using FIG. 17 and Table 3. The imaging optical system 20 of the 3rd example has the same configuration as the imaging optical system 20 of the 1st example illustrated in FIG. 14, and detailed descriptions and illustrations are omitted.

In Table 3 indicated below, each of specifications in the 3rd example are indicated. A radius of curvature R of the 1st surface to the 5th surface in Table 3 correspond to reference signs R1 to R5 given to the 1st surface to the 5th surface in FIG. 14, respectively.

TABLE 3

[Overall specifications]

| | |
|---|---|
| f | 5 |
| L | 3.65 |
| BF | 3.75277 |
| FN | 10 |
| YM | 4.05 |
| SR | −10 |
| YO | 1 |

[Lens specifications]

| Surface number | R | D | nd | vd | |
|---|---|---|---|---|---|
| Object surface | ∞ | ∞ | | | |
| 1 | ∞ | 0.0000 | | | (Aperture stop) |
| 2 | 3.3194 | 1.7000 | 1.658440 | 50.84 | |
| 3 | −2.1131 | 0.5000 | 1.755200 | 27.57 | |
| 4 | −14.8694 | 3.6500 | | | |
| 5 | ∞ | 0.10277 | | | (Field diaphragm) |
| Image surface | −10.00000 | | | | |

[Conditional expression corresponding value]

| | |
|---|---|
| Conditional expression (1) | L/BF = 0.97261 |
| Conditional expression (2) | FN² × cos(YM/SR) = 91.91024 |

In this way, in the present example, it turns out that the above-mentioned conditional expressions (1) to (2) are all fulfilled.

Figure 17:
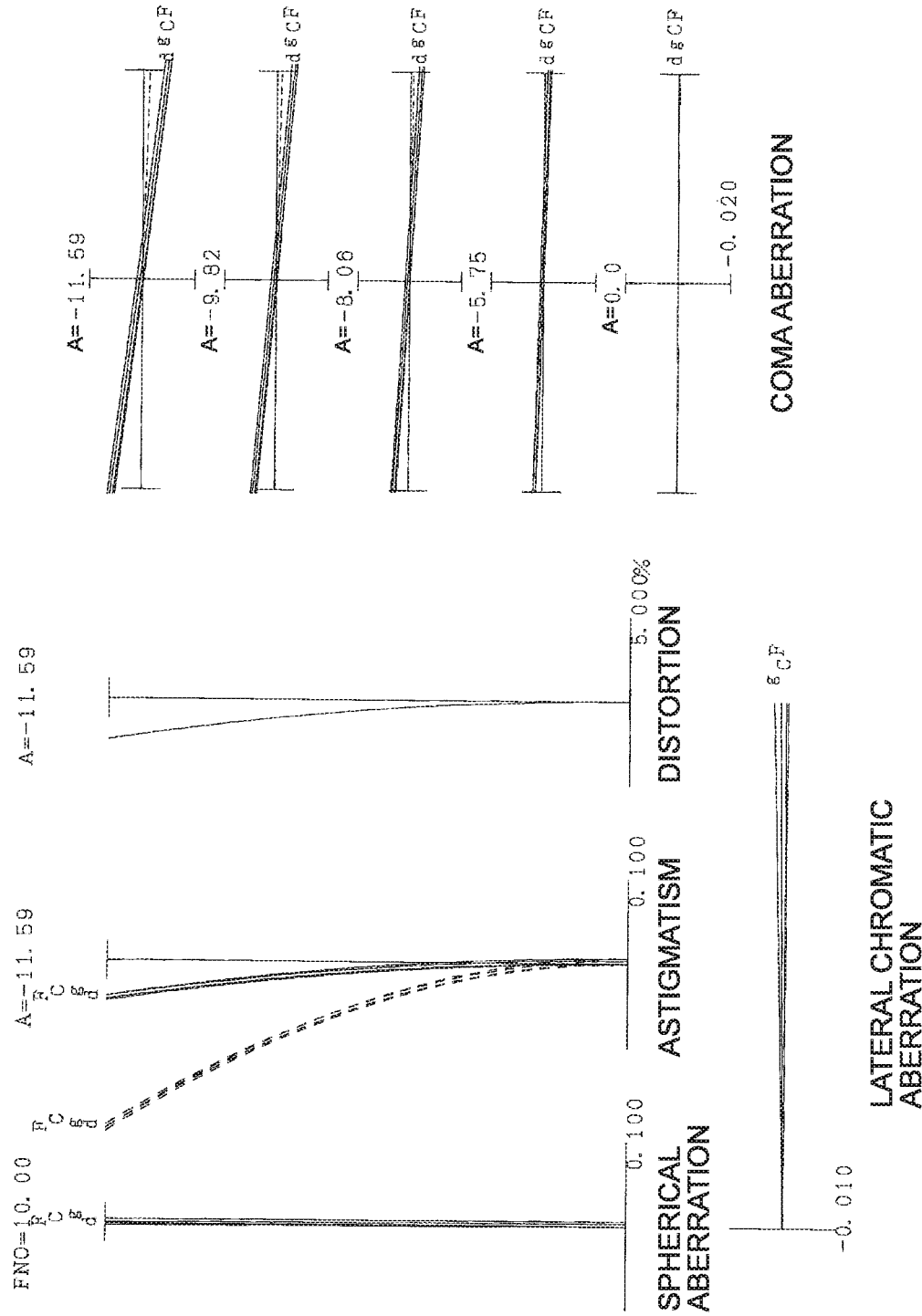
FIG. 17 illustrates a graphs showing various aberrations with respect to a 3rd example of the imaging optical system according to the first embodiment.

FIG. 17 illustrates graphs showing various aberrations of the imaging optical system 20 according to the 3rd example. It is understood from each of aberration graphs that the 3rd example has various aberrations corrected satisfactory, and has an excellent optical performance. As the result, also in the imaging device 10, an excellent optical performance can be secured by incorporating the imaging optical system 20 of the 3rd example.

As mentioned above, according to each of the examples, the imaging optical system 20 which is smaller and has high image formation performance and the imaging device 10 provided with this, can be realized while a wide visual field range is secured.

Incidentally, ones such as described in the following will be acceptable as the imaging optical system, the imaging device, the manufacturing method of the imaging device and the imaging method, according to this embodiment.

First, as an imaging optical system, there is one where the imaging optical system has an formed on a curved imaging surface having a concave surface facing an object side and has moving section including at least one lens, and the moving section is movable relatively to the imaging surface so that an image forming position in accordance with an object point of the same range may move along the concave surface.

Incidentally, the relative movement of the moving section with the imaging surface may be an oscillation around a point located on an optical axis of the imaging optical system in the imaging optical system.

Furthermore, lenses included in the moving section may be all the lenses included in the imaging optical system.

Furthermore, while having a field diaphragm which restricts a visual field range of the imaging optical system, the moving section may be oscillatable integrally with the field diaphragm.

Furthermore, the field diaphragm is disposed in an image side rather than the moving section, and may satisfy the following conditional expression, $$0.5 < L/BF < 1.0$$

where, L denotes a distance between the lens surface closest to the image side and the field diaphragm on the optical axis in the moving section, and BF denotes a distance between the lens surface closest to the image side and the imaging surface on the optical axis in the moving section.

Furthermore, the relative movement of the moving section with the imaging surface may be an oscillation around a position neighborhood of an exit pupil of the imaging optical system.

Furthermore, while being curved so as to have a concave surface facing an object side in a cross section viewed from a 1st direction orthogonal to a direction along an optical axis of the imaging optical system, the imaging surface may be curved so as to have a concave surface facing an object side in a cross section viewed from a 2nd direction orthogonal to both a direction along an optical axis of the imaging optical system and the 1st direction.

Next, an imaging device is configured by being provided with an above-mentioned imaging optical system and an image pickup element imaging a subject image formed by the imaging optical system, and the image pickup element has an effective acceptance surface constituting at least a part of the imaging surface, and a visual field range of the imaging optical system is smaller than a range of the effective acceptance surface.

Incidentally, in this imaging device, an optical axis of the imaging optical system may move within the effective acceptance surface by movement of the moving section with respect to the imaging surface.

Furthermore, the image pickup element may output 1st image data with the subject image captured in a 1st state before the moving section moving with respect to the imaging surface, and 2nd image data with the subject image captured in a 2nd state after the moving section moving with respect to the imaging surface.

Furthermore, one image data may be synthesized using the 1st image data and the 2nd image data.

Furthermore, the image pickup element has an effective light acceptance section capable of receiving a light from the imaging optical system while the effective acceptance surface is formed, and the effective light acceptance section has at least a 1st pixel and a 2nd pixel, and an optical axis of the imaging optical system is located at least in one region of the 1st pixel and the 2nd pixel by movement of the moving section with respect to the imaging surface, and the image pickup element synthesizes image data at the time of an optical axis of the imaging optical system being located in a region of the 1st pixel with image data at the time of an optical axis of the imaging optical system being located in a region of the 2nd pixel, and may output them as one image data.

Furthermore, the following conditional expression is satisfied, $$0 < FN^2 \times \cos(YM/SR) < 100$$

where, FN denotes F number of the imaging optical system, YM denotes maximum image height in the imaging surface of the image pickup element, and SR may denote radius of curvature of the imaging surface of the image pickup element.

Furthermore, the relative movement of the moving section with the imaging surface may be an oscillation of the moving section with respect to the imaging surface around a position neighborhood of a curvature center of the imaging surface curved so as to have a concave surface facing an object side.

Next, as a manufacturing method of an imaging device, a method of manufacturing an imaging device having an above-mentioned imaging optical system and an image pickup element imaging a subject image formed by the imaging optical system, wherein the image pickup element has an effective acceptance surface constituting at least a part of the imaging surface, and a visual field range of the imaging optical system is configured so as to be smaller than the range of the effective acceptance surface, and the image pickup element is configured so as to be moved using an image imaging-acquired by the image pickup element in a state with the moving section moved to a prescribed reference position with respect to the imaging surface and to be adjusted so that a prescribed part of the image pickup element may be located on an optical axis of the imaging optical system.

In this manufacturing method, using information on two or more of detection positions in an image imaging-acquired by the image pickup element, an inclination of the image pickup element may be adjusted.

Furthermore, the two or more of detection positions may be three or more mutually different detection positions.

Next, as an imaging method, an imaging method using an imaging optical system described above and an image pickup element imaging a subject image formed by the imaging optical system, wherein the image pickup element has an effective acceptance surface constituting at least a part of the imaging surface formed, and has an effective light acceptance section capable of receiving a light from the imaging optical system, and the effective light acceptance section has at least the 1st pixel and the 2nd pixel, and a visual field range of the imaging optical system is configured so as to be smaller than a range of the effective acceptance surface, and an optical axis of the imaging optical system is made to be located in at least one region of the 1st pixel and the 2nd pixel by movement of the moving section with respect to the imaging surface, and the image pickup element is configured so as to be made to output image data as single image data by synthesizing image data at the time of an optical axis of the imaging optical system being located in a region of the 1st pixel with image data at the time of an optical axis of the imaging optical system being located in a region of the 2nd pixel.

EXPLANATION OF NUMERALS AND CHARACTERS

10 Imaging device
20 Imaging optical system

21 Moving lens
22 Positive lens
23 Negative lens
25 Field diaphragm
30 Oscillating drive section
40 Image pickup element
41 Imaging surface
42 Effective light acceptance section
60 Imaging device (modification example)
80a-80c Image pickup element
81a-81c Effective acceptance surface
81a-81c Effective light acceptance section
110 Imaging device (the second embodiment)
120 Imaging optical system
121 Imaging lens
122 1st positive lens
123 Negative lens
124 2nd positive lens
125 Field diaphragm
130 Oscillating drive section
140 Image pickup element
141 Imaging surface

The invention claimed is:

1. An imaging device, comprising:
an imaging optical system including at least one lens and configured to form an image on an imaging surface curved so as to have a concave surface facing an object side; and
a moving section configured to move relative to the imaging surface and thereby move the imaging optical system so as to change a direction of an optical axis of the imaging optical system and move an image forming position of the imaging optical system along the concave surface.

2. The imaging device according to claim 1, wherein all lenses included in the imaging device are configured by lenses included in the imaging optical system.

3. The imaging device according to claim 1, further comprising:
a field diaphragm configured to restrict a visual field range of the imaging optical system, wherein
the imaging optical system is oscillatable integrally with the field diaphragm.

4. The imaging device according to claim 3, wherein the field diaphragm is disposed in an image side, and satisfies the following conditional expression, $$0.5 < L/BF < 1.0$$

where,
L: a distance on the optical axis between a lens surface closest to the image side in the imaging optical system and the field diaphragm,
BF: a distance on the optical axis between the lens surface closest to the image side in the imaging optical system and the imaging surface.

5. The imaging device according to claim 3, wherein the imaging optical system includes an aperture stop and the field diaphragm, and
the imaging optical system is oscillatable integrally with the field diaphragm and the aperture stop.

6. The imaging device according to claim 5, wherein the imaging optical system is configured with the aperture stop, the at least one lens, and the field diaphragm disposed in this order from the object side.

7. The imaging device according to claim 1, wherein a relative movement of the imaging optical system with respect to the imaging surface is an oscillation around a position in a neighborhood of an exit pupil of the imaging optical device.

8. The imaging device according to claim 1, wherein while being curved so as to have a concave surface facing the object side in a cross section viewed from a 1st direction orthogonal to a direction along the optical axis of the imaging optical system, the imaging surface is configured to be curved so as to have a concave surface facing the object side in a cross section viewed from a 2nd direction orthogonal to both a direction along the optical axis of the imaging optical system and the 1st direction.

9. The imaging device according to claim 8, wherein the optical axis of the image optical system is movable along the 1st direction and the 2nd direction.

10. The imaging device according to claim 1, further comprising
an image pickup element configured to capture a subject image formed by the imaging optical system, wherein
the image pickup element has an effective acceptance surface to form at least a part of the imaging surface, and
a visual field range of the imaging optical system is smaller than a range of the effective acceptance surface.

11. The imaging device according to claim 10, wherein the optical axis of the imaging optical system moves within the effective acceptance surface by movement of the imaging optical system with respect to the imaging surface.

12. The imaging device according to claim 11, wherein the image pickup element outputs 1st image data which the image pickup element captures of the subject image in a 1st state before the imaging optical system moves with respect to the imaging surface, and 2nd image data which the image pickup element captures of the subject image in a 2nd state after the imaging optical system moves with respect to the imaging surface.

13. The imaging device according to claim 12, further comprising an image processing section configured to synthesize one image data using the 1st image data and the 2nd image data.

14. The imaging device according to claim 13, wherein the image pickup element outputs the 2nd image data more than two times, and
the image processing section generates the image data based on the second image data outputted after the second time.

15. The imaging device according to claim 14, wherein the image pickup element makes a signal in a region where the 2nd image data and the 1st image data are overlapped outputted.

16. The imaging device according to claim 10, wherein the image pickup element has an effective light acceptance section capable of receiving a light from the imaging optical system while the effective acceptance surface is formed, and
the effective light acceptance section has at least a 1st pixel and a 2nd pixel, and
the optical axis of the imaging optical system is located at least in one region of the 1st pixel and the 2nd pixel by movement of the imaging optical system with respect to the imaging surface, and
the image pickup element, while synthesizing image data at the time of the optical axis of the imaging optical system being located in a region of the 1st pixel with image data at the time of the optical axis of the imaging optical system being located in a region of the 2nd pixel, outputs them as one image data.

17. The imaging device according to claim 10, wherein the following conditional expression is satisfied, $$0<FN^2\times\cos(YM/SR)<100$$

where

FN: a F number of the imaging optical system, and

YM: a maximum image height in the imaging surface of the image pickup element, and SR: a radius of curvature of the imaging surface of the image pickup element.

18. The imaging device according to claim 10, wherein relative movement of the imaging optical system with respect to the imaging surface is an oscillation of the imaging optical system with respect to the imaging surface around a position in a neighborhood of a curvature center of the imaging surface curved so as to have a concave surface facing an object side.

19. The imaging device according to claim 10, wherein relative movement of the imaging optical system with respect to the imaging surface is an oscillation around a point located on the optical axis of the imaging optical system, and the imaging optical system makes a center of the oscillation in a case where the imaging optical system captures an infinite distance and a center of the oscillation in a case where the imaging optical system captures a short distance different from each other.

20. A manufacturing method of an imaging device according to claim 1 and including an image pickup element to capture a subject image formed by the imaging optical system, wherein the image pickup element is configured to have an effective acceptance surface to form at least a part of the imaging surface, and a visual field range of the imaging optical system is configured so as to be smaller than a range of the effective acceptance surface, and the image pickup element is made to move using an image acquired by the image pickup element in a state where the imaging optical system is made to move to a prescribed reference position with respect to the imaging surface, and adjusting is carried out so that a prescribed part of the image pickup element is located on the optical axis of the imaging optical system.

21. The manufacturing method of the imaging device according to claim 20, wherein an inclination of the image pickup element is adjusted using information on a plurality of different detection positions in an image acquired by the image pickup element.

22. The manufacturing method of the imaging device according to claim 21, wherein the plurality of detection positions are three or more different detection positions.

23. An imaging method configured to use an imaging device according to claim 1 and an image pickup element which captures a subject image formed by the imaging optical system, wherein the image pickup element is configured to have an effective light acceptance section capable of receiving a light from the imaging optical system while an effective acceptance surface to form at least a part of the imaging surface is formed, and the effective light acceptance section is configured to have at least a 1st pixel and a 2nd pixel, and a visual field range of the imaging optical system is configured so as to be smaller than a range of the effective acceptance surface, and the optical axis of the imaging optical system is made to be located in at least one region of the 1st pixel and the 2nd pixel by movement of the imaging optical system with respect to the imaging surface, and the image pickup element is made to synthesize image data at the time of the optical axis of the imaging optical system being located within a region of the 1st pixel and image data at the time of an optical axis of the imaging optical system being located within a region of the 2nd pixel, and to output them as one image data.

* * * * *